(12) United States Patent
Yang

(10) Patent No.: US 9,204,697 B2
(45) Date of Patent: Dec. 8, 2015

(54) PROTECTIVE CASING PROVIDING IMPACT ABSORPTION AND WATER RESISTANCE FOR PORTABLE ELECTRONIC DEVICES

(71) Applicant: Sampson Yang, Irvine, CA (US)

(72) Inventor: Sampson Yang, Irvine, CA (US)

(73) Assignee: THE JOY FACTORY, INC., Irvine, CA (US)

( * ) Notice: Subject to any disclaimer, the term of this patent is extended or adjusted under 35 U.S.C. 154(b) by 350 days.

(21) Appl. No.: 13/737,874

(22) Filed: Jan. 9, 2013

(65) Prior Publication Data

US 2013/0220841 A1    Aug. 29, 2013

Related U.S. Application Data

(60) Provisional application No. 61/585,132, filed on Jan. 10, 2012.

(51) Int. Cl.
   *G06F 1/16* (2006.01)
   *A45C 11/00* (2006.01)
   (Continued)

(52) U.S. Cl.
   CPC .................. *A45C 11/00* (2013.01); *B63C 11/02* (2013.01); *B63C 11/26* (2013.01); *G06F 1/1626* (2013.01); *B63C 2011/021* (2013.01); *G06F 2200/1633* (2013.01)

(58) Field of Classification Search
   CPC .............................. G06F 1/1626; H05K 5/068
   USPC ........ 206/811, 320, 701; 361/679.55, 679.56, 361/679.02, 679.3
   See application file for complete search history.

(56) References Cited

U.S. PATENT DOCUMENTS

| | | | |
|---|---|---|---|
| 3,023,885 A | 3/1962 | Kindseth | |
| 3,339,722 A * | 9/1967 | Van Antwerpen | ............ 206/453 |
| 3,482,895 A | 12/1969 | Becklin | |

(Continued)

FOREIGN PATENT DOCUMENTS

| | | |
|---|---|---|
| JP | 8288990 | 11/1996 |
| JP | 2000341383 | 12/2000 |

(Continued)

OTHER PUBLICATIONS

Hard Candy Cases—Bubble 360 Case for the new iPAD—retrieved from http://www.hardcandycases.com/bubble-360-case—for-new-ipad.html—Apr. 9, 2012.

(Continued)

*Primary Examiner* — Steven A. Reynolds
*Assistant Examiner* — King M Chu
(74) *Attorney, Agent, or Firm* — Jen-Feng Lee, Esq.

(57) ABSTRACT

A water-resistant casing for a portable electronic device is provided. The water-resistant casing may include a front cover. The front cover may include a water-resistant film enabling a user operation of the portable electronic device through the water-resistant film, and an impact-absorbing seal to provide water resistance and impact absorption. The water-resistant casing may also include a back cover coupled to the front cover. The back cover may include a material that is at least water-resistant or impact-absorbing. The water-resistant casing may further include a sealing structure to provide a water-resistant seal, and a latching mechanism for enclosing the water-resistant casing. The water-resistant casing may further include at least one mounting point and at least one impact-absorbing structure for providing additional impact absorption.

25 Claims, 8 Drawing Sheets

(51) Int. Cl.
*B63C 11/26* (2006.01)
*B63C 11/02* (2006.01)

(56) References Cited

U.S. PATENT DOCUMENTS

| | | | |
|---|---|---|---|
| 3,665,991 A | 5/1972 | Gillemot et al. | |
| 4,097,878 A | 6/1978 | Cramer | |
| 4,312,580 A | 1/1982 | Schwomma et al. | |
| 4,375,323 A | 3/1983 | Inagaki et al. | |
| 4,383,743 A | 5/1983 | Nozawa et al. | |
| 4,418,830 A | 12/1983 | Dzung et al. | |
| 4,420,078 A | 12/1983 | Belt et al. | |
| 4,546,874 A | 10/1985 | Kirchhan | |
| 4,584,718 A | 4/1986 | Fuller | |
| 4,658,956 A | 4/1987 | Takeda et al. | |
| 4,686,332 A | 8/1987 | Greanias et al. | |
| 4,712,657 A | 12/1987 | Myers et al. | |
| 4,733,776 A | 3/1988 | Ward | |
| 4,762,227 A | 8/1988 | Patterson | |
| 4,803,504 A | 2/1989 | Maeno et al. | |
| 4,836,256 A | 6/1989 | Meliconi | |
| 4,942,514 A | 7/1990 | Miyagaki et al. | |
| 4,963,902 A | 10/1990 | Fukahori | |
| 4,977,483 A | 12/1990 | Perretta | |
| 4,994,829 A | 2/1991 | Tsukamoto | |
| 5,002,184 A | 3/1991 | Lloyd | |
| D316,932 S | 5/1991 | Escher, Jr. | |
| 5,025,921 A | 6/1991 | Gasparaitis et al. | |
| D322,165 S | 12/1991 | Lloyd | |
| 5,087,934 A | 2/1992 | Johnson | |
| 5,092,458 A | 3/1992 | Yokoyama | |
| 5,092,459 A | 3/1992 | Uljanic et al. | |
| 5,175,873 A * | 12/1992 | Goldenberg et al. | 455/351 |
| 5,177,515 A | 1/1993 | Tsukamoto | |
| 5,231,381 A | 7/1993 | Duwaer | |
| 5,239,323 A | 8/1993 | Johnson | |
| 5,239,324 A | 8/1993 | Ohmura et al. | |
| 5,285,894 A | 2/1994 | Kamata et al. | |
| 5,305,032 A | 4/1994 | Arai | |
| 5,368,159 A | 11/1994 | Doria | |
| 5,383,091 A | 1/1995 | Snell | |
| 5,388,691 A | 2/1995 | White | |
| 5,388,692 A | 2/1995 | Withrow et al. | |
| 5,541,813 A | 7/1996 | Satoh et al. | |
| RE35,318 E | 8/1996 | Warman | |
| 5,548,306 A | 8/1996 | Yates, IV et al. | |
| 5,583,742 A | 12/1996 | Noda et al. | |
| 5,584,054 A | 12/1996 | Tyneski et al. | |
| 5,590,760 A | 1/1997 | Astarb | |
| D378,634 S | 4/1997 | LaPere | |
| 5,669,004 A | 9/1997 | Sellers | |
| 5,707,757 A | 1/1998 | Lee | |
| 5,713,048 A | 1/1998 | Hayakawa | |
| 5,713,466 A | 2/1998 | Tajima | |
| 5,850,915 A | 12/1998 | Tajima | |
| 5,907,721 A | 5/1999 | Schelling et al. | |
| 5,946,501 A | 8/1999 | Hayakawa | |
| 5,956,291 A | 9/1999 | Nehemiah et al. | |
| 5,982,520 A | 11/1999 | Weiser et al. | |
| 5,990,874 A | 11/1999 | Tsumura et al. | |
| 6,068,119 A | 5/2000 | Derr et al. | |
| 6,092,707 A | 7/2000 | Bowes, Jr. | |
| 6,094,785 A | 8/2000 | Montgomery et al. | |
| 6,128,441 A | 10/2000 | Kamata et al. | |
| 6,132,367 A | 10/2000 | Adair | |
| 6,201,867 B1 | 3/2001 | Koike | |
| D447,634 S | 9/2001 | Snider | |
| 6,313,982 B1 | 11/2001 | Hino | |
| 6,317,313 B1 | 11/2001 | Mosgrove et al. | |
| 6,349,824 B1 | 2/2002 | Yamada | |
| 6,415,138 B2 | 7/2002 | Sirola et al. | |
| 6,456,487 B1 | 9/2002 | Hetterick | |
| 6,519,141 B2 | 2/2003 | Tseng et al. | |
| 6,536,589 B2 | 3/2003 | Chang | |
| 6,574,434 B2 | 6/2003 | Matsuoto et al. | |
| 6,594,472 B1 | 7/2003 | Curtis et al. | |
| 6,597,865 B1 | 7/2003 | Negishi et al. | |
| 6,614,423 B1 | 9/2003 | Wong et al. | |
| 6,616,111 B1 | 9/2003 | White | |
| 6,625,394 B2 | 9/2003 | Smith et al. | |
| 6,634,494 B1 | 10/2003 | Derr et al. | |
| 6,636,697 B2 | 10/2003 | Smith et al. | |
| 6,659,274 B2 * | 12/2003 | Enners | 206/305 |
| 6,665,174 B1 | 12/2003 | Derr et al. | |
| 6,760,570 B1 | 7/2004 | Higdon, Jr. | |
| 6,778,388 B1 | 8/2004 | Minelli | |
| 6,785,566 B1 | 8/2004 | Irizarry | |
| 6,822,640 B2 | 11/2004 | Derocher | |
| 6,914,774 B1 | 7/2005 | Albertini et al. | |
| 6,955,293 B1 | 10/2005 | Katsanevs | |
| 6,975,888 B2 | 12/2005 | Buesseler et al. | |
| 6,980,777 B2 | 12/2005 | Shepherd et al. | |
| 6,995,976 B2 | 2/2006 | Richardson | |
| 7,046,230 B2 | 5/2006 | Zadesky et al. | |
| 7,050,841 B1 | 5/2006 | Onda | |
| 7,082,264 B2 | 7/2006 | Watanabe et al. | |
| 7,106,959 B2 | 9/2006 | Sato | |
| 7,158,376 B2 * | 1/2007 | Richardson et al. | 361/679.56 |
| 7,180,735 B2 | 2/2007 | Thomas et al. | |
| 7,194,291 B2 | 3/2007 | Peng | |
| 7,255,228 B2 | 8/2007 | Kim | |
| 7,312,984 B2 | 12/2007 | Richardson et al. | |
| 7,352,961 B2 | 4/2008 | Watanabe et al. | |
| 7,365,281 B2 | 4/2008 | Yamaguchi et al. | |
| 7,369,881 B2 | 5/2008 | Tsujimoto | |
| 7,432,439 B2 * | 10/2008 | Takada et al. | 174/50 |
| 7,609,512 B2 * | 10/2009 | Richardson et al. | 361/679.41 |
| D605,850 S | 12/2009 | Richardson et al. | |
| 7,789,228 B2 | 9/2010 | Zenzai | |
| 7,801,425 B2 | 9/2010 | Fantone et al. | |
| 7,889,489 B2 | 2/2011 | Richardson et al. | |
| 7,933,122 B2 | 4/2011 | Richardson et al. | |
| 7,941,196 B2 | 5/2011 | Kawasaki et al. | |
| D644,636 S | 9/2011 | Richardson et al. | |
| 8,164,899 B2 | 4/2012 | Yamaguchi et al. | |
| 8,191,706 B1 | 6/2012 | Liu | |
| 8,204,561 B2 | 6/2012 | Mongan et al. | |
| 8,342,325 B2 | 1/2013 | Rayner | |
| 8,403,136 B1 * | 3/2013 | Tsai | 206/320 |
| 8,503,170 B1 * | 8/2013 | Hsu et al. | 361/679.02 |
| 8,800,764 B2 * | 8/2014 | Wu | 206/320 |
| 8,955,678 B2 * | 2/2015 | Murphy et al. | 206/320 |
| 2001/0040109 A1 | 11/2001 | Yaski et al. | |
| 2002/0003584 A1 | 1/2002 | Kossin | |
| 2002/0079244 A1 | 6/2002 | Kwong | |
| 2002/0085709 A1 | 7/2002 | Hsu | |
| 2002/0090212 A1 | 7/2002 | Shimamura et al. | |
| 2002/0136557 A1 | 9/2002 | Shimamura | |
| 2002/0137475 A1 | 9/2002 | Shou et al. | |
| 2002/0175901 A1 | 11/2002 | Gettemy | |
| 2002/0193136 A1 | 12/2002 | Halkosaari et al. | |
| 2002/0195910 A1 | 12/2002 | Hus et al. | |
| 2003/0080947 A1 | 5/2003 | Genest et al. | |
| 2003/0111366 A1 | 6/2003 | Enners | |
| 2003/0118332 A1 | 6/2003 | Smith et al. | |
| 2003/0118334 A1 | 6/2003 | Smith et al. | |
| 2003/0128397 A1 | 7/2003 | Smith et al. | |
| 2003/0223577 A1 | 12/2003 | Ono | |
| 2004/0014506 A1 | 1/2004 | Kemppinen | |
| 2004/0089570 A1 | 5/2004 | Chien et al. | |
| 2004/0203502 A1 | 10/2004 | Dietrich et al. | |
| 2005/0052425 A1 | 3/2005 | Zadesky et al. | |
| 2005/0094024 A1 | 5/2005 | Sato | |
| 2005/0110768 A1 | 5/2005 | Marriott et al. | |
| 2005/0174727 A1 * | 8/2005 | Thomas et al. | 361/681 |
| 2005/0181843 A1 | 8/2005 | Tsujimoto | |
| 2005/0247584 A1 | 11/2005 | Lu | |
| 2006/0008261 A1 | 1/2006 | Watanabe et al. | |
| 2006/0110146 A1 | 5/2006 | Ariga | |
| 2007/0040931 A1 | 2/2007 | Nishizawa | |
| 2007/0071423 A1 | 3/2007 | Fantone et al. | |
| 2007/0074473 A1 | 4/2007 | Yamaguchi et al. | |
| 2007/0115387 A1 | 5/2007 | Ho | |
| 2007/0261978 A1 | 11/2007 | Sanderson | |

(56) References Cited

U.S. PATENT DOCUMENTS

| | | |
|---|---|---|
| 2007/0280053 A1 | 12/2007 | Polany et al. |
| 2007/0297149 A1 | 12/2007 | Richardson et al. |
| 2008/0081679 A1 | 4/2008 | Kawasaki et al. |
| 2008/0164267 A1 | 7/2008 | Huber |
| 2008/0316687 A1* | 12/2008 | Richardson et al. .......... 361/680 |
| 2009/0017884 A1 | 1/2009 | Rotschild |
| 2009/0087655 A1 | 4/2009 | Yamada et al. |
| 2009/0117957 A1 | 5/2009 | Araki et al. |
| 2009/0167545 A1 | 7/2009 | Osaka |
| 2009/0211775 A1 | 8/2009 | Yamaguchi et al. |
| 2009/0260844 A1* | 10/2009 | Tseng .......................... 174/50.5 |
| 2009/0314907 A1* | 12/2009 | Romerein et al. ......... 248/205.1 |
| 2010/0181108 A1 | 7/2010 | Hata et al. |
| 2010/0311475 A1 | 12/2010 | Takatsuka et al. |
| 2011/0024315 A1* | 2/2011 | Kim ............................... 206/320 |
| 2011/0290676 A1* | 12/2011 | Kershenstein ................. 206/37 |
| 2012/0000908 A1* | 1/2012 | So ................................. 220/281 |
| 2012/0018325 A1 | 1/2012 | Kim |
| 2012/0031914 A1 | 2/2012 | Liu |
| 2012/0043235 A1* | 2/2012 | Klement ....................... 206/320 |
| 2012/0099261 A1 | 4/2012 | Reber |
| 2012/0099262 A1 | 4/2012 | Reber et al. |
| 2012/0099265 A1 | 4/2012 | Reber |
| 2012/0099266 A1 | 4/2012 | Reber et al. |
| 2012/0103844 A1 | 5/2012 | Piedra et al. |
| 2012/0168336 A1 | 7/2012 | Schmidt et al. |
| 2012/0314354 A1* | 12/2012 | Rayner .................... 361/679.01 |
| 2013/0322013 A1* | 12/2013 | Steele ...................... 361/679.55 |
| 2013/0341222 A1* | 12/2013 | Lin ............................... 206/320 |
| 2014/0076753 A1* | 3/2014 | Limber et al. ................ 206/320 |

FOREIGN PATENT DOCUMENTS

| | | |
|---|---|---|
| JP | 2001046132 | 2/2001 |
| WO | WO 94/00037 | 1/1994 |
| WO | WO 99/41958 | 8/1999 |
| WO | WO 00/51315 | 8/2000 |
| WO | WO 02/11161 | 2/2002 |
| WO | WO 2012/074151 | 6/2012 |

OTHER PUBLICATIONS

Griffin cases & covers for iPhone 4 and iPhone 4s—retrieved from http://www.griffintechnology.com/iphone/cases—Apr. 9, 2012.

BodyGlove Zero 360° case for iPhone 4 and iPhone 4s—Retrieved from http://www.otterbox.com/commuter-series/commuter-series,default,pg.html.

Case Mate Chrome with Mirror Screen Protector for iPhone 4 and iPhone 4s—retrieved from http://www.case-mate.com//iphone-4-4s-olo-cases/case-mate-iphone-4-4s-chrome-with-mirror-screen-protector.asp.

* cited by examiner

PROTECTIVE CASING PROVIDING IMPACT ABSORPTION AND WATER RESISTANCE FOR PORTABLE ELECTRONIC DEVICES

CROSS REFERENCE TO RELATED APPLICATION

This application claims the benefit of priority to U.S. provisional Application No. 61/585,132 filed with the United States Patent and Trademark Office on Jan. 10, 2012, and entitled "PROTECTIVE CASES PROVIDING SHOCK AND WATER RESISTANCE FOR PORTABLE COMPUTING DEVICES", which is hereby incorporated by reference in its entirety.

TECHNICAL FIELD

The subject matter of the present application relates to protective casings for portable electronic devices, in particular, to protective casings providing impact-absorption and water-resistance for portable electronic devices.

BACKGROUND

Portable electronic devices, such as Apple's Iphone®, various generations of Apple's iPad® (including iPad 2®, etc.), Samsung's Galaxy® or Galaxy series tablets, tablets, Android® tablets, tablet PCs, smart phones, other touch-panel devices, digital cameras, camcorders, e-readers, various generations of Kindle®, various generations of Nook®, and many other devices, are becoming more and more popular and have wide varieties of applications. Some of the applications may require a device to operate under conditions or in environments that may increase the possibility of physical impacts, water/moisture/dust damages, temperature effects, etc. The operating or environmental conditions may therefore affect portable electronic devices' reliability and operability. Thus, a measure to provide some level of shock/drop/impact-, water-, dust-, and/or chemical-resistance and/or other forms of protection is desired to protect a portable electronic device or improve its operability or reliability under various operating conditions.

Moreover, many commercially available cases for protecting electronic devices may offer some level of protections, with some of them conforming to the IPX5 water-resistance standard defined in the International Electrotechnical Commission (IEC) document No. 60529. Generally, cases that conform to the IPX5 water-resistance standard may be limited to protection of the enclosed devices against water jets of specific circumstances. For example, the cases may protect the enclosed device against water projected at all angles through a 6.3 mm nozzle at a flow rate of 12.5 liters/minute and a pressure of 30 kPa for at least 3 minutes from a distance of 3 meters. But the cases might not protect operating conditions different from those.

Some cases, while providing protections above the IPX5 standard, may have large dimensions, turning portable devices into a bulky and less-convenient alternative. Some other cases prevent the operations of portable electronic devices when enclosed, making underwater or other operations impossible.

Therefore, it may be desirable to provide protective casings that may offer one or more of water-resistance, operability of devices, underwater operations, impact absorption, enhanced structural strength, and acceptable dimensions or portability.

SUMMARY OF THE INVENTION

The present disclosure provides water-resistant casing for a portable electronic device. According to one embodiment, the water-resistant casing comprises a front cover comprising: a water-resistant film enabling a user operation of the portable electronic device through the water-resistant film, and an impact-absorbing seal coupled with a perimeter of the water-resistant film to provide water resistance and impact absorption; a back cover coupled to the front cover, the back cover comprising a material that is at least water-resistant or impact-absorbing; a sealing structure coupled to a perimeter of at least one of the front cover and the back cover to provide a water-resistant seal; a latching mechanism mounted on at least one outer edge of at least one of the front cover and the back cover, for enclosing the water-resistant casing along at least a portion of the outer perimeter of the water-resistant casing; at least one mounting point coupled to or integrated in the back cover; and at least one impact-absorbing structure detachably coupled to at least one of the front cover and the back cover externally for providing additional impact absorption.

The present disclosure further provides a water-resistant casing for an electronic tablet. According to one embodiment, the water-resistant casing comprises a front cover comprising a water-resistant shield enabling a user operation of the electronic tablet through the water-resistant shield, an water-resistant seal coupled with a perimeter of the water-resistant shield to provide water resistance and impact absorption, and at least two water-barriers and at least one seal strip disposed between the at least two water-barriers; a back cover coupled to the front cover, the back cover comprising a material that is at least water-resistant or impact-absorbing; at least one rim coupled to a perimeter of the back cover, the at least one rim being capable of contacting with the at least one seal strip to provide water-resistance; at least one air chamber that is incorporated into at least one of the front cover and the back cover for controlling air release or water intake when the water-resistant casing is underwater and for controlling air intake or water release when the water-resistant casing is taken out of water; a plurality of rotatable latches mounted on at least one outer edge of at least one of the front cover and the back cover, for enclosing the water-resistant casing along at least a portion of the outer perimeter of the water-resistant casing; and at least one impact-absorbing structure detachably coupled to at least one of the front cover and the back cover externally for providing additional impact absorption.

The present disclosure further provides a protective casing for an electronic tablet. According to one embodiment, the protective casing comprises a front cover comprising a flexible impact-resistant shield enabling a user operation of the electronic tablet through the flexible impact-resistant shield, the flexible impact-resistant shield being water-resistant, and an impact-absorbing seal coupled with the perimeter of the flexible impact-resistant shield to provide water resistance and impact absorption; a back cover coupled to the front cover, the back cover comprising a heat-dissipating material that is at least water-resistant or impact-absorbing; a sealing structure coupled to a perimeter of at least one of the front cover and the back cover to provide a water-resistant seal; at least one cushion snugly attached to protrusions coupled to an inside of or incorporated into the back cover, wherein the at least one cushion comprises plastic or rubber and is used for adjusting a gap between a back surface of the electronic tablet and the back cover; a plurality of rotatable latches mounted on at least one outer edge of at least one of the front cover and the back cover, for enclosing the protective casing along at least a portion of the outer perimeter of the protective casing; at least one mounting point coupled to or integrated in the back cover to enable at least one of a mounting of a detachable handle for the protective casing and an attachment of a soft carrying mechanism to enable a single-handed operation of the electronic tablet; and at least one detachable anti-collision bumper coupled to the external corners or edges of at least one of the front cover and the back cover for providing additional impact absorption.

DETAILED DESCRIPTION

The aforementioned and other aspects, solutions, and advantages of the presently claimed subject matter will become apparent from the following descriptions and corresponding drawings. The embodiments further clarify the presently claimed subject matter and shall not be construed to limit the scope of the present claimed subject matter.

Figure 1:
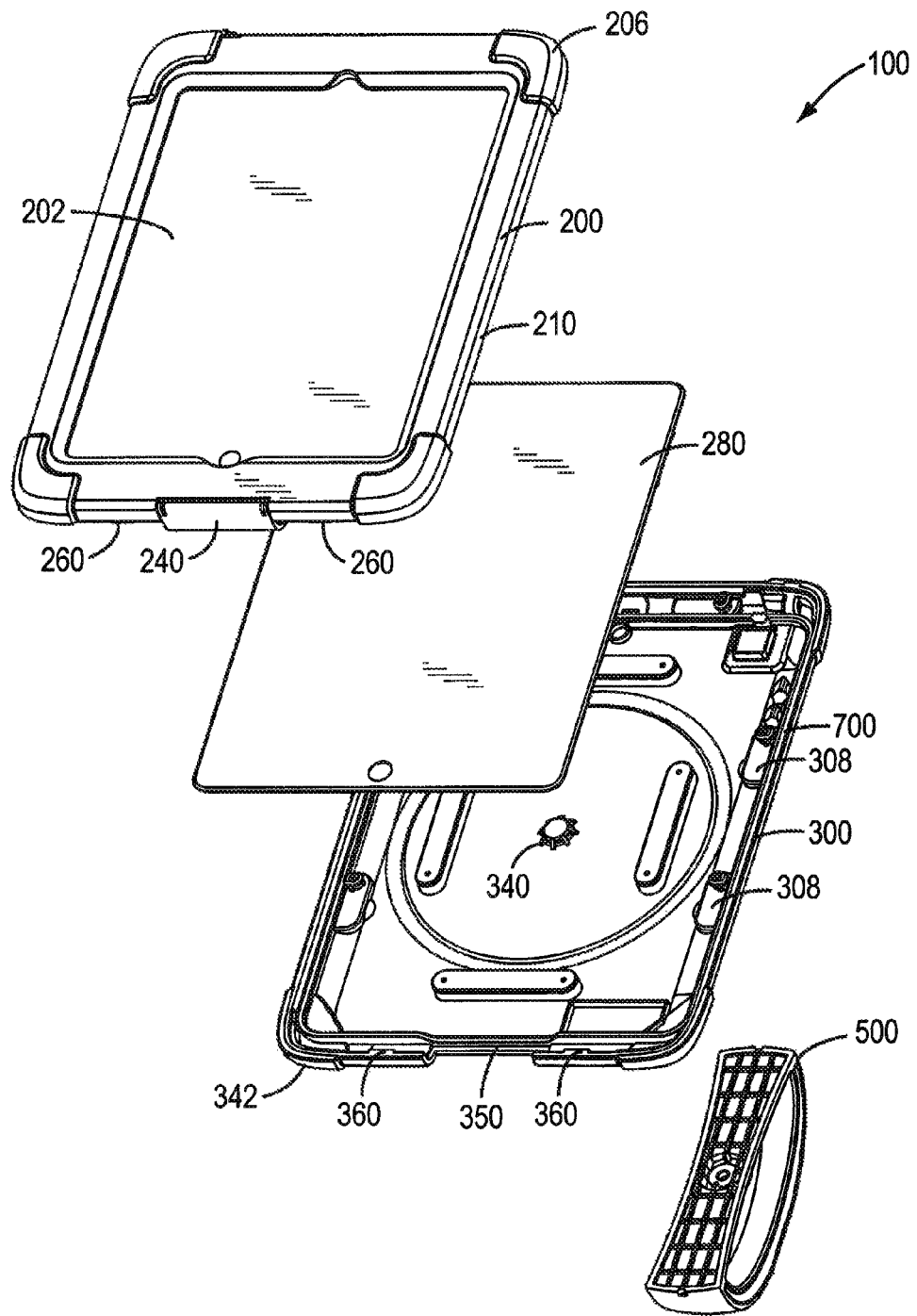
FIG. 1 illustrates an exemplary, exploded view of an exemplary water-resistant casing consistent with an embodiment of the present disclosure.

FIG. 1 illustrates an exemplary, exploded view of water-resistant casing 100 consistent with an embodiment of the present disclosure. Referring to FIG. 1, an exemplary water-resistant casing 100 for portable electronic device 280 includes front cover 200, back cover 300 and detachable handle 500. Front cover 200 comprises water-resistant film 202, which enables a user's operation of portable electronic device 280 through water-resistant film 202. Front cover 200 may also include impact-absorbing seal 210, which may be coupled with water-resistant film 202 around or near its perimeter or edges and may provide water resistance, impact absorption, or both functions. Front cover 200 may also include resealable cap 240 for covering and water-sealing corresponding opening 350 of back cover 300. In some embodiments, opening 350 may be used for the user's access to certain input and/or output interfaces of portable electronic device 280, such as a headphone, microphone, data, video, or audio communication interfaces, etc.

Back cover 300 can be coupled to front cover 200 through coupling mechanism 260, which may include mechanisms placed on or near front cover 200 and corresponding coupling mechanism 360 of back cover 300. Various ways and mechanisms may be used for enclosing water-resistant casing 100. In some exemplary embodiments, a clamshell design may be used with coupling mechanism 360. For example, referring to FIG. 1, water-resistant casing 100 can have coupling mechanism 260, such as one or more protrusions or tabs, of front cover 200 and corresponding coupling mechanism 360 of back cover 300, such as one or more recesses, slots, or holes. In some other embodiments, coupling mechanisms 260 and 360 may include, for example, one or more hinges, latches, hooks, etc., which may hingedly, rotatably, movably, permanently, detachably, or latchably attach front cover 200 to back cover 300 at at-least one edge of water-resistant casing 100.

Back cover 300 can be made of material that is water-resistant, impact-absorbing, or both. Impact-absorbing seal 210 may be coupled with at least one of front cover 200 and back cover 300, such as around or near either one's perimeter or edges, and serve the function of a water-resistant seal. Front cover 200 and back cover 300 may also include latching mechanism 308 on at least one outer edge of front cover 200, back cover 300, or both, for enclosing and/or securing water-resistant casing 100 along at least a portion of the outer perimeter of water-resistant casing 100 so front and back covers 200 and 300 are secured to portable electronic device 280. When front cover 200 is attached, coupled, or secured to back cover 300, water-resistant casing 100 may provide protection of the enclosed portable electronic device 280 from being damaged by water, shock, dust-, oil, mud, snow, vibration, spill, drop, impact, heat, frost, acid, chemical, corrosion, rain, sand, and/or other forms of intrusion.

Moreover, back cover 300 may include mounting point 340, which may enable a mounting of detachable handle 500 for water-resistant casing 100. In addition, one or more impact-absorbing structures (206, 342, or both) may be coupled to front cover 200, back cover 300, or both. In some embodiments, an impact-absorbing structure may be optional and detachable, or can be permanently attached (such as glued or molded) to one or both of front cover 200 and back cover 300. The impact-absorbing structures may be attached thereto internally or externally for providing additional impact absorption. Furthermore, detachable handle 500 may be attached to water-resistant casing 100. Detachable handle 500 may enable the carrying or supporting water-resistant casing 100. Detachable handle 500 may be used as a stand for a user to place portable electronic device 280, enclosed in water-resistant casing 100, in a portrait or landscape position. Referring to FIG. 1, one of ordinary skill in the art would appreciate that water-resistant casing 100 can be modified or adjusted to remove some of the components described or add additional components.

In some exemplary embodiments, water-resistant casing 100 may have dimensions that are slightly longer, wider, and/or thicker, such as about 3% to 30% (or even 50% or 70%) longer, wider, and/or thicker to enclose a portable electronic device therein. That is, in these embodiments, water-resistant casing 100 can form a slim cover of portable electronic device 280. As a non-limiting example, portable electronic device 280 in FIG. 1 may be an Apple® iPad®, iPad 2®, mini iPad®, Samsung Galaxy Tablet®, Google Nexus®, Amazon Kindle®, or other tablet devices, user operable devices, or electronic devices. Using an iPad 2® as an example, the iPad 2® can be placed between front cover 200 and back cover 300. The iPad 2® has a length of about 9.5 inches or 241.3 mm, a width of about 7.31 inches or 185.7 mm, and a thickness of about 0.34 inches or 8.6 mm. In some exemplary embodiments, when water-resistant casing 100 closes, it may have a length of about 275 mm, a width of about 221 mm, and a thickness of about 21 mm. Thus, the dimensions of water-resistant casing 100 do not increase significantly from the dimensions of portable electronic device 280. Furthermore, in some embodiments, water-resistant casing 100 can enable a tight fit of portable electronic device 280 when it is placed inside water-resistant casing 100, so that portable electronic device 280 does not move, shift, flip, or engage in any motion that can potentially cause damage to portable electronic device 280. Because of the tight fit of portable electronic device 280, a strap or fastening mechanism may not be needed to hold portable electronic device 280 in place.

The dimensions of water-resistant casing 100 may be varied, configured or adjusted depending on the portable electronic devices, applications, needs, environments, etc. and offer various levels of the casing's protective or other characteristics, such as enclosing portable electronic device 280, providing impact absorption, providing water-resistance, preserving the external appearance of portable electronic device 280, providing structural strength to water-resistant casing 100, maintaining operability, providing portability, etc. Each of the dimensions, i.e., length, width and thickness, of water-resistant casing 100 may vary independently and separately by about +/−5% to 20% or +/−5% to 50% (or even 70%), depending on the circumstances, such as the level of protection required, types of the devices being protected, the intended operating environments, the cost/size/weight considerations, etc.

Similarly, the ratios of the external dimensions of water-resistant casing 100 to the dimensions of portable electronic device 280 in those three aspects may be applied to various casings for various types of portable electronic device 280. In various embodiments, each of the external length, width and thickness ratios may vary independently and separately in the range of about 5% to 20% or 5% to 50% or even 70% relative to the size of portable electronic device 280. The dimensions of water-resistant casing 100 may be varied depending on the applications, such as the level of protection needed, types of the devices being protected, the intended operating environments, the cost/size/weight considerations, etc. In some embodiments, such as the operation of portable electronic device 280 in deep water or sea, the dimensions in length, width, or thickness of water-resistant casing 100 can be further increased to one or several times more than those of portable electronic device 280. The dimensions of water-resistant casing 100 may vary depending on different types of portable electronic device 280, different levels of impact- or water-protection requirement, or other different design requirements.

As to materials of water-resistant casing 100, different types of plastics, rubber, silicone, metals, alloys, treated nylons, cloth, canvas, or leather, and combination of two or more materials can be used for the various components and parts illustrated above and below. For example, front cover 200, back cover 300, and/or some of the components associated with can be formed by molding one or more of these materials. Impact-absorbing seal 210 may be formed by molding or shaping silicone, rubber, etc. Water-resistant film 202 may use or include materials such as thermoforming plastics, polyvinylchoride materials, polycarbonate, polyethylene terephthalate (PET), poly methyl methacrylate acrylic (PMMA), adhesive tape, etc.

In some exemplary embodiments, the materials of water-resistant casing 100 or other protective casings, as will be described below, may also enable wireless communication of portable electronic device 280. That is, signals of various wireless communication methods, such as cellular communication, Wi-Fi, GPS, AM/FM radio communications, Bluetooth, infrared, etc., may pass through water-resistant casing 100 without substantial degradation. In some other embodiments, the materials of the water-resistant casing 100 and/or the protective casings can be, for example, metal or alloy, so that some wireless signals may be shielded or filtered in order to reduce or eliminate the impact of undesired noise or interferences to portable electronic device 280. Water-resistant casing 100 may also be made of rubber or plastic coated with a metallic film for shielding or filtering purposes. In some embodiments, water-resistant casing 100 may include a metal frame surrounding portion or all of the parameter of front cover 200 and/or back cover 300. The metal frame can enhance the strength of water-resistant casing 100 and can also be used as antennas for portable electronic device 280, so that certain wireless signals, such as Wi-Fi signals can be enhanced to compensate any degradation it may have when passing through water-resistant casing 100.

Water-resistant casing 100 may be formed by injection molding technologies, double injection technologies, insert injection technologies, etc. For example, an injection molding process can form water-resistant casing 100 from thermoplastic, thermosetting plastic, polycarbonate, or other materials including metals, alloys, glasses, etc. In a typical injection molding process, material is fed into a heated container, mixed, and forced into a mold space where it cools and hardens to the configuration of the space. The injection molding process can be a one-step molding process or a multiple-step molding process. Thus, in some embodiments, water-resistant casing 100 may be formed as an integral part, i.e., one piece. In some other embodiments, water-resistant casing 100 may be form as two or more separate pieces. For example, front cover 200 may be separately formed from back cover 300 in a two-step molding process. As another example, water-resistant casing 100 with one or more impact-absorbing structures (206, 342, or both) may be formed by double injection technologies. As a third example, water-resistant casing 100 with metallic parts, such as metallic nuts, may be formed by insert injection technologies. Each of the elements shown in FIG. 1 will now be discussed in detail corresponding to FIGS. 2-9.

Figure 2:
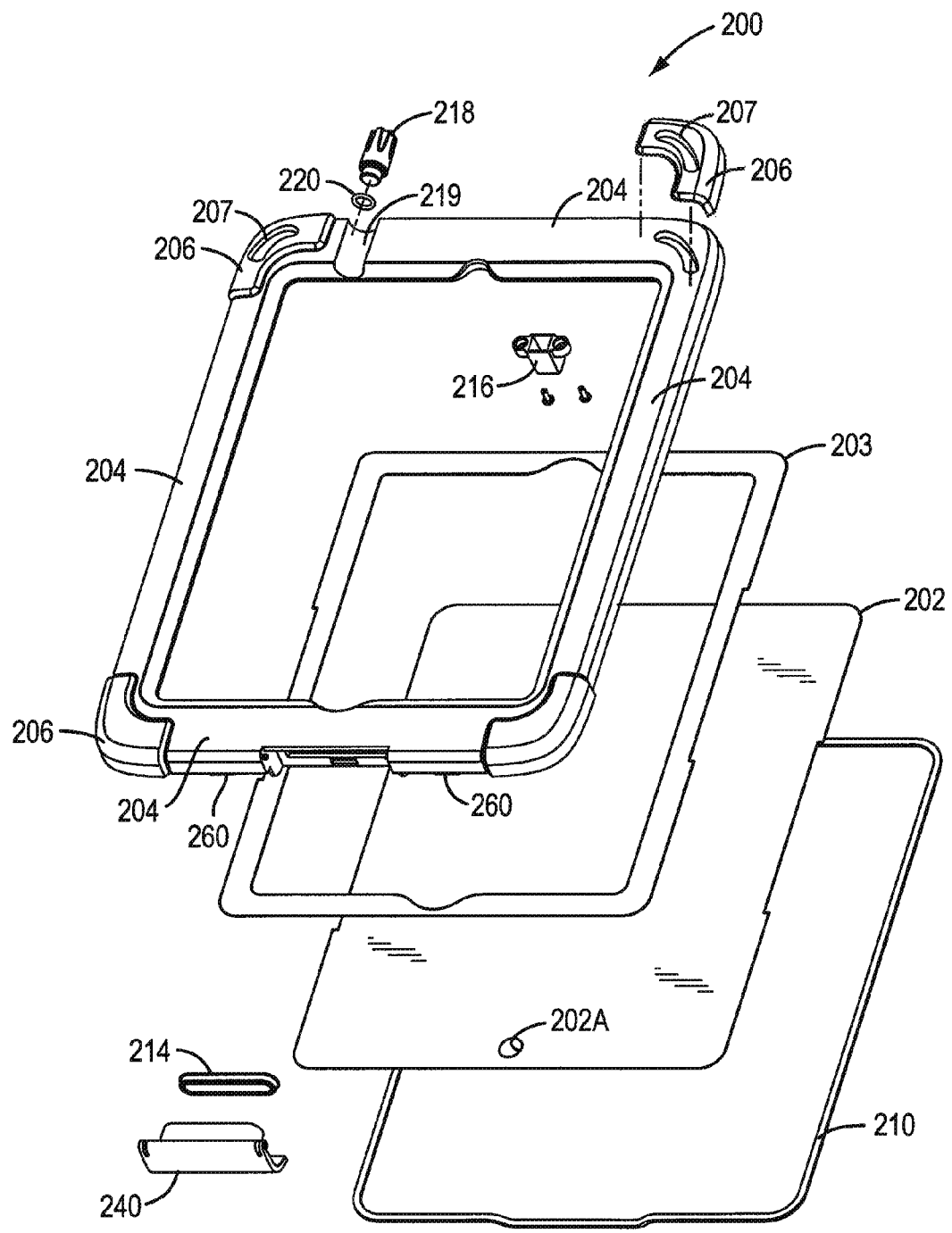
FIG. 2 illustrates an exemplary, exploded view of the front cover of the water-resistant casing as shown in FIG. 1.

FIG. 2 illustrates an exemplary, exploded view of front cover 200 of water-resistant casing 100 as shown in FIG. 1. Front cover 200 includes water-resistant film 202, which enables a user's operation of a portable electronic device (e.g., portable electronic device 280 as shown in FIG. 1) through water-resistant film 202; edge 204 surrounding water-resistant film 202, which provides structural strength; and one or more impact-absorbing structure 206, which is detachably coupled to front cover 200 externally and provides additional impact absorption. Front cover 200 may also include impact-absorbing seal 210, which is coupled with the perimeter of water-resistant film 202 to provide water resistance and impact absorption. Front cover 200 also includes resealable cap 240 for covering and water-sealing corresponding opening 350 of back cover 300 as shown in FIG. 1. Resealable cap 240 has water seal 214 to provide water resistance. Opening 350 of back cover 300 may enable, for example, at least one of a charging of and wired communication with the portable device.

Furthermore, front cover 200 includes coupling mechanism 260 for coupling front cover 200 to back cover 300. Front cover 200 may also include security mechanism 216, which is capable of being coupled with an external lock (not shown in FIG. 2) for securing portable electronic device 280. In addition, cap 218 is coupled with one side of the outer edge 204 of front cover 200 for enabling a wired communication between portable electronic device 280 and an external object. Cap 218, which may be removable or resealable, includes sealing ring 220 to provide water resistance. Furthermore, front cover 200 includes a sealing structure (not shown in FIG. 2), which will be discussed corresponding to FIGS. 8A-8B.

Referring to FIG. 2, front cover 200 comprises water-resistant film 202, which enables a user's operation of portable electronic device 280 (shown in FIG. 1) through water-resistant film 202. In some exemplary embodiments, water-resistant film 202 can be made of thermoforming plastics, polyvinylchoride materials, polycarbonate, poly methyl methacrylate acrylic (PMMA), polyester, adhesive tape, etc. Water-resistant film 202 can be flexible but also can have an enhanced strength so that it can withstand a water pressure under a higher water standard. For example, water-resistant film 202 may be capable of withstanding a condition that is specified in the IPX7 standard, i.e., a water immersion for at least 30 minutes at a depth of at least 1 meter. Water-resistant film 202 may also be capable of withstanding a condition of a higher IPX8 standard, i.e., a continual submersion in water under conditions which are identified by the manufacturer.

Water-resistant film 202 can be a clear/transparent or substantially clear/transparent water-resistant film so that a user can view the screen or a substantial portion of the screen of portable electronic device 280. In addition, water-resistant film 202 can also enable a user's operation of the portable electronic device 280 when it is enclosed in water-resistant casing 100. For example, some portable electronic devices have capacitive-type touch sensors that are incorporated in the touch-point screens. A user can operate these portable electronic devices by touching and/or moving on the surface of the touch-point screen. Water-resistant film 202 can thus be a touch-sensitive or transmissive film that enables the user to operate a touch-point screen of portable electronic device 280 through water-resistant film 202. Therefore, operations can be carried out without opening water-resistant casing 100. In other words, water-resistant film 202 can enable portable electronic device 280 to be operated when it is immersed under water or other liquids. One of ordinary skill in the art would appreciate that water-resistant film 202 can also be other types of films that can enable operating of portable electronic device 280, such as resistance-sensitive films.

In some exemplary embodiments, water-resistant film 202 can also be an anti-reflection film, an anti-glare film, an anti-fingerprint film, a monitor filtering film, etc. For example, water-resistant film 202 may filter out the light reflected from the smooth glass surface of the touch screen device as well as the radiation emitted from portable electronic device 280. This may be used to protect the user privacy by decreasing the viewing angle of the screen of portable electronic device 280. In addition, water-resistant film 202 may also be able to dissipate static electrical charge buildup. Water-resistant film 202 may also be polarized, colorized, or tinted, depending on the application.

Moreover, portable electronic device 280, as shown in FIG. 1, may have buttons or switches, such as the "home" button on an Apple iPad® device. Referring to FIG. 2, in some exemplary embodiments, water-resistant film 202 may include a corresponding convex or concave shape to enable convenient operation of portable electronic device 280. As an example, for an Apple iPad® device, water-resistant film 202 may include a concave circle 202A near the bottom edge for operating of the "home" button. One of ordinary skill in the art would appreciate that concave circle 202A may be positioned anywhere on water-resistant film 202. In addition, water-resistant film 202 may include any number of shapes, buttons, membranes, etc., which can enable convenient operation of portable electronic device 280.

Referring to FIG. 2, water-resistant film 202 may be coupled to front cover 200 by attaching mechanism 203. In some embodiments, attaching mechanism 203 can be an adhesive material that is water-resistant. For example, attaching mechanism 203 may include an adhesive material that is water-proof up to 1 meter below the water surface. In some embodiments, when the adhesive materials are used, water-resistant film 202 may not be replaceable. That is, replacing water-resistant film 202 may cause damage to water-resistant film 202 and render it non-useable. Thus, in these embodiments, water-resistant film 202 may be made of or combined with strength enhancing, anti-scratch or anti-breaking material, so that damage to water-resistant film 202 can be reduced or eliminated. Water-resistant film 202 may thus have a longer life time. In some other embodiments, attaching mechanism 203 may allow water-resistant film 202 to be replaced if it is scratched or damaged. Water-resistant film 202 in these embodiments may have a shorter life time but may be relatively inexpensive.

Referring to FIG. 2, front cover 200 comprises edge 204 surrounding water-resistant film 202 for providing structural strength. Edge 204 can be made of hard-rubber, soft-rubber, plastic, polymer, etc. Examples of the materials include silicone, acrylonitrile butadiene styrene, polycarbonate, acrylonitrile butadiene styrene (ABS), and thermoplastic polyurethane (TPU). Edge 204 can be rugged, patterned, ribbed, or foamed for impact-absorption or impact-resistance. The length, width, and thickness of edge 204 may vary and may be adjusted to reduce physical impact to portable electronic device 280.

Referring to FIG. 2, front cover 200 can also comprise at least one impact-absorbing structure 206 that is detachably coupled to front cover 200 externally for providing additional impact absorption. Impact-absorbing structure 206 may include one or more type of impact/shock-absorbing or impact/shock-reducing materials that can eliminate or reduce physical forces or stresses passed onto portable electronic device 280 in an event of a physical impact or stress. For example, impact-absorbing structure 206 can be made of elastic materials, plastics, soft rubber, hard rubber or any combination thereof that are suitable for reducing stresses caused by physical impact. Examples of the materials include silicone rubber, acrylonitrile butadiene styrene, polycarbonate, and thermoplastic polyurethane (TPU).

Moreover, depending on the impact-absorbing requirement, the material of impact-absorbing structure 206 may or may not be the same as the material of edge 204. For example, an elastic material may be used for impact-absorbing structure 206, and a rugged hard-rubber material may be used for edge 204. In addition, the size of impact-absorbing structure 206 may vary and may be adjusted to enhance the reduction of physical impact. As an example, impact-absorbing structure 206 may be designed such that portable electronic device 280 (shown in FIG. 1) can still function correctly after water-resistant casing 100 is dropped multiple times from a height of 122 cm. In addition, the drop may be in a manner that the corner, the edge or the face of water-resistant casing 100 will be impacted first. Impact-absorbing structure 206, together with other protective, impact-reducing/absorbing, or shock-absorbing structures of water-resistant casing 100, can be designed to protect the portable electronic device 280 from being damaged.

In some exemplary embodiments, impact-absorbing structure 206 may have rounded corners at the four ends of the structure. Compared with a straight right-angled corner, a rounded corner may further reduce the stress caused by a physical impact in some circumstances. It is understood by those skilled in the art that different shapes of impact-absorbing structure 206 may be used for different circumstances, depending on the impact-absorbing requirements.

Referring to FIG. 2, in some exemplary embodiments, more than one impact-absorbing structure 206 may be coupled to or incorporated in front cover 200. For example, each of the four corners of front cover 200 can have an impact-absorbing structure 206. One of ordinary skill in the art would appreciate that any number of impact-absorbing structure 206 can be coupled to or incorporated in front cover 200 at any location. Moreover, the same or similar material of impact-absorbing structure 206 can be incorporated anywhere in front cover 200. As an example, the entire edge 204, which surrounds water-resistant film 202 of front cover 200, can include the material that is same or similar to that of impact-absorbing structure 206. In addition, impact-absorbing structure 206 may also be detachable so that it can be replaced with different types having different materials, different shapes, difference colors, different dimensions, etc. A detachable impact-absorbing structure 206 can enable customization to meet different impact absorption requirements and/or different appearance requirements.

In some exemplary embodiments, front cover 200 can include at least one opening 207 that is incorporated in impact-absorbing structure 206 or edge 204. For example, FIG. 2 illustrates that openings 207 is included in each impact-absorbing structure 206 at the two corners of front cover 200. The two openings 207 can enable water-resistant casing 100 (shown in FIG. 1) to be attached to other objects or a carrying person via a hanging or carrying mechanism, such as a rope, a belt, a string, a hook, etc. In some exemplary embodiments, one or more openings 207 may be located at a shorter edge of front cover 200, such as shown in FIG. 2. When one or more openings 207 are located at the short edge, the hanging or carrying mechanism that is attached to openings 207 enables a portrait (vertical) view of portable electronic device 280. In some other embodiments, one or more openings 207 may be located at a longer edge of front cover 200 to enable a landscape (horizontal) view of portable electronic device 280. One of ordinary skill in the art would appreciate that opening 207 can also be located anywhere on water-resistant casing 100. In addition, any number of openings 207 may be included.

Referring to FIG. 2, in some exemplary embodiments, impact-absorbing seal 210 is coupled with the perimeter of water-resistant film 202 to provide water-resistance and impact-absorption. In some other embodiments, more than one seal may be included. Impact-absorbing seal 210 can be made of a water-resistant rubber or any other suitable materials (e.g., silicone rubber). Impact-absorbing seal 210 can protect portable electronic device 280 by providing water/moisture-, chemical-, dust-, snow-, mud-, oil-resistance when front cover 200 and back cover 300 are enclosed by pressing at least part of impact-absorbing seal 210. Impact-absorbing seal 210 can also prevent or minimize water, moisture, or air intrusion and can provide resistance to the external water or air pressure. Impact-absorbing seal 210 may also provide another layer of impact absorption or shock protection in addition to the other components, such as front cover 200, back cover 300, impact-absorbing structures 206, and, in some cases, one or more latches.

Referring to FIG. 2, in some embodiments, front cover 200 can include resealable cap 240 for covering and sealing corresponding opening 350 as shown in FIG. 1. Resealable cap 240 and opening 350 will be discussed in detail corresponding to FIG. 6. Resealable cap 240 may also include water seal 214 surrounding the parameter of the resealable cap 240 to provide water resistance.

Referring to FIG. 2, front cover 200 can include security mechanism 216 associated with front cover 200 and back cover 300 (shown in FIG. 1). Security mechanism 216 is capable of being coupled with an external lock for securing portable electronic device 280 (shown in FIG. 1). Security mechanism 216 can be located at anywhere on front cover 200. Referring to FIG. 2, as an example, security mechanism 216 is located at the center of a shorter edge of front cover 200. In some exemplary embodiments, security mechanism 216 may include a lock hole at or near front cover 200. The lock hole can be used with, for example, a laptop lock or a Kensington® lock, to secure water-resistant casing 100 (shown in FIG. 1). Security mechanism 216 can also be used with other types of locks, such as combinational locks, etc.

Referring to FIG. 2, front cover 200 can include cap 218 that is coupled with front cover 200 for enabling a wired communication between portable electronic device 280 (shown in FIG. 1) and an external object. For example, cap 218 can enable external communication with an ear phone connector of portable electronic device 280. Front cover 200 can also include sealing ring 220 surrounding the parameter of cap 218 for providing water-resistance. Front cover 200 also includes half-cylindrical portion 219 (the other half-cylindrical portion 327 is on a corresponding position of back cover 300, as will be discussed corresponding to FIG. 3) for mounting of cap 218.

Figure 3:
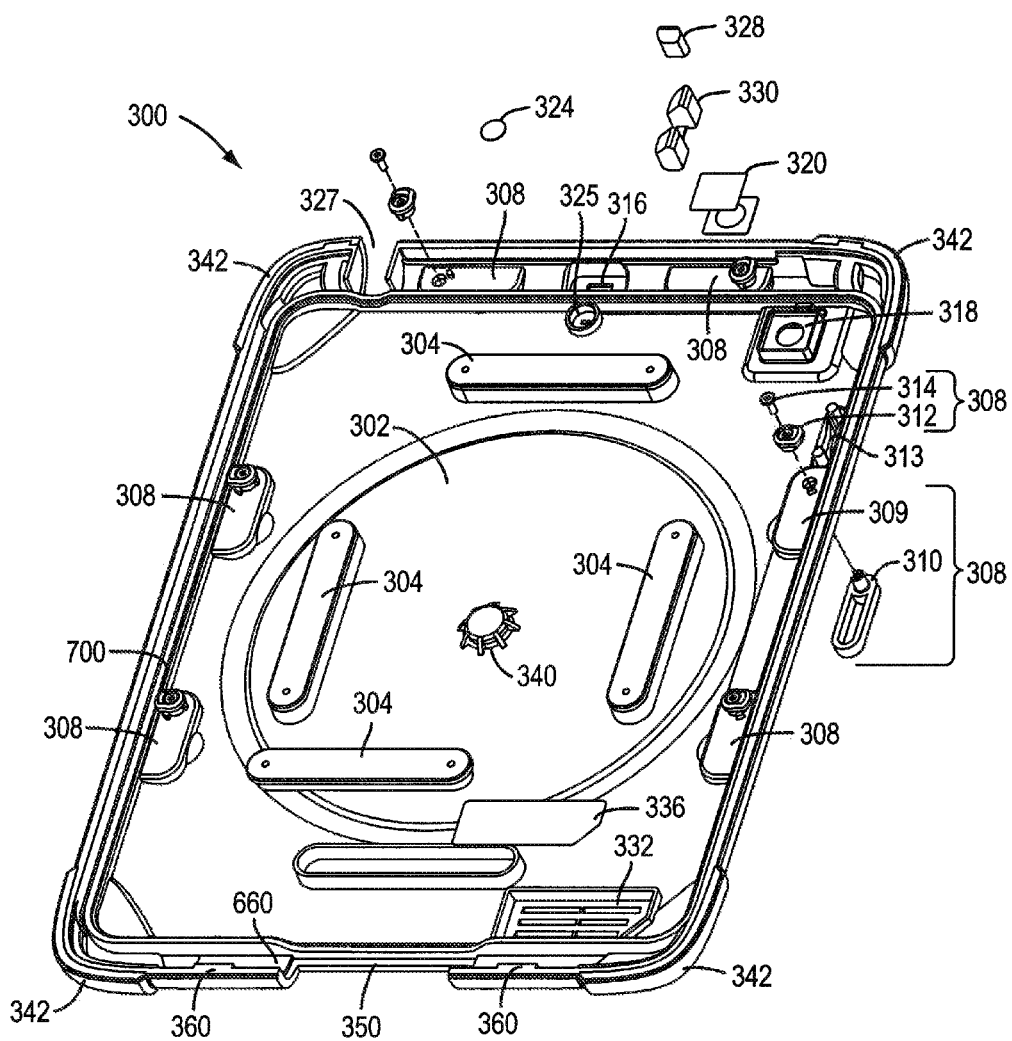
FIG. 3 illustrates an exemplary, exploded view of the inside of the back cover of the water-resistant casing as shown in FIG. 1.

FIG. 3 illustrates an exemplary, exploded view of the inside of back cover 300 of water-resistant casing 100 as shown in FIG. 1. Back cover 300 is coupled to front cover 200 (shown in FIG. 2). Back cover 300 can be made of a material that is water-resistant, impact-absorbing, or both. Back cover 300 includes one or more impact-absorbing structures 304, which is attached to inner surface 302 of back cover 300. Impact-absorbing structure 304 can also be incorporated into back cover 300. Impact-absorbing structure 304 can be made of rubber and is configured to provide a gap between a back surface of portable electronic device 280 (shown in FIG. 1) and back cover 300. The sealing structure is coupled to the perimeter or edges of back cover 300 and may provide a water-resistant seal. Back cover 300 also includes latching mechanism 308, which is mounted on one or more outer edges of front cover 200 (not shown in FIG. 3) and back cover 300, or both. Latching mechanism 308 enables the enclosing of water-resistant casing 100 along its outer perimeter or edges.

Referring to FIG. 3, back cover 300 may further includes security mechanism opening 316, and one or more shaped portions, such as 318, 325, 327, 328, 330, and 332. The one or more shaped portions correspond to at least one of a lever, button, switch, and operating mechanism of portable electronic device 280 (shown in FIG. 1) and may enable an operation of portable electronic device 280 without opening water-resistant casing 100. One of ordinary skill in the art would appreciate that some or all of the shaped portions can also be attached to or incorporated in front cover 200 as shown in FIG. 2.

Referring to FIG. 3, back cover 300 further comprises mounting point 340, which is coupled to or integrated in back cover 300. Mounting point 340 may enable a mounting of a detachable handle, such as detachable handle 500 shown in FIG. 1, to water-resistant casing 100. In addition, back cover 300 can further include at least one impact-absorbing structure 342, which is coupled to back cover 300 for providing additional impact-absorption.

Referring to FIG. 3, back cover 300 comprises a material that is at least water-resistant or impact-absorbing. For example, back cover 300 can be made of metal, metal alloys, hard-rubber, soft-rubber, plastic, polymer, etc. Examples of the materials include silicone rubber, acrylonitrile butadiene styrene, polycarbonate, and thermoplastic polyurethane (TPU). Back cover 300 can be rugged, patterned, ribbed, or foamed for impact-absorption or impact-resistance. The thickness of back cover 300 may vary and may be adjusted to reduce or minimize physical impact to portable electronic device 280. The thickness of back cover 300 may either be greater or smaller than front cover 200. Back cover 300 may also include rubber rib or rubber rib mesh (not shown in FIG. 3) to enhance its strength.

Furthermore, back cover 300 can enable heat dissipation of enclosed portable electronic device 280 (shown in FIG. 1), with or without requiring additional venting openings of water-resistant casing 100. For example, back cover 300 can be made of thermal conductivity materials such as aluminum alloys, copper, silver, gold, liquid metal, etc. Back cover 300 may also include small arrays of comb-like or fin-like protrusions to increase the heat dissipation capacity. Back cover 300 may also be made with multiple layers of thermal conductivity materials with liquid or gas fillings between the layers. In some embodiments, additional venting may be required and thus back cover 300 may need to include resealable openings that allow heat dissipation through air venting.

Referring to FIG. 3, back cover 300 comprises one or more impact-absorbing structures 304. In some exemplary embodiments, impact-absorbing structure 304 is detachable from back cover 300. In some other exemplary embodiments, impact-absorbing structure 304 may be incorporated in back cover 300. Impact-absorbing structure 304 can be any shape and can be positioned anywhere at the inside of back cover 300. For example, referring to FIG. 3, four pieces of obround-shaped impact-absorbing structure 304 are included in back cover 300 and positioned parallel to the four edges of back cover 300.

Impact-absorbing structure 304 can have one integrated body made of hard-rubber, soft-rubber, plastic, polymer, etc. Impact-absorbing structure 304 may provide cushioning or additional protection to portable electronic device 280 by further absorbing physical impact and/or stress. Moreover, impact-absorbing structure 304 can also provide a gap between the back surface of portable electronic device 280 and back cover 300. Thus, impact-absorbing structure 304 enables devices having different thicknesses, such as iPad®, iPad2®, and the new Ipad®, to fit into water-resistant casing 100.

Impact-absorbing structure 304 may include two bodies, i.e., a top body and a bottom body. The two bodies may be made of different materials. As an example, the top body may be made of soft-rubber or plastic for providing cushioning of portable electronic device 280. The bottom body may be made of hard-rubber, hard-plastic, or other rigid materials and may be made of the same material as back cover 300. The top and bottom bodies may also include a protrusion and a groove, respectively, to enable the coupling of the bodies. The top and bottom bodies may further include features to enhance the coupling of the two bodies, such as including additional protrusions and/or grooves so that the friction between two bodies may be increased.

Impact-absorbing structure 304 can also be made of materials that dissipate heat from portable electronic device 280. For example, heat dissipation rubber or paste can be used. In some embodiments, a portion of Impact-absorbing structure 304 can be coated or combined with heat conducting metals. Thus, impact-absorbing structure 304 may provide heat dissipation from portable electronic device 280 to back cover 300.

Referring to FIG. 3, back cover 300 also comprises a latching mechanism 308, which is mounted on one or more outer edges of front cover 200 (shown in FIG. 1), back cover 300, or both. Latching mechanism 308 may enable the enclosing of water-resistant casing 100 along its outer perimeter or edges. Latching mechanism 308 comprises static body 309, rotating body 310, which is coupled to static body 309 by hook 312, and screw 314. A corresponding latching mechanism, such as a protrusion or a tab, can be included in front cover 200 for operating with latch mechanism 308. In some exemplary embodiments, in order to open up water-resistant casing 100 and release latching mechanism 308, rotating body 310 of latching mechanism 308 can be turned relatively to static body 309 so that hook 312 is released from the protrusion or tab. One of ordinary skill in the art would appreciate that latching mechanism 308 may also be operated by pulling, pushing, rotating, touching, etc, of rotating body 310, which would allow opening or closing of the casing.

In some exemplary embodiments, referring to FIG. 3, back cover 300 may include six instances of latching mechanism 308 for enabling and/or enhancing the water-resistance of water-resistant casing 100. As an example, referring to FIG. 3, the six instances of latching mechanism 308 may be distributed such that two instances are positioned at the top edge, two are at the left edge and two are at the right edge. Such distribution of the instances of latching mechanism 308 may allow uniform sealing of water-resistant casing 100 by applying the same or substantially the same amount of force on each of the edges. One of ordinary skill in the art would appreciate that any number of instances of latching mechanism 308 can be included. In addition, multiple instances of latching mechanism 308 may be distributed in any desirable manner.

Referring to FIG. 3, back cover 300 includes one or more protrusions 313, for operating portable electronic device 280 (shown in FIG. 1). Protrusions 313, for example, may correspond to a volume button of an Apple iPad® series device. Protrusions 313 can be mounted on or integrated in a portion of back cover 300 that is made of a soft material, such as rubber or plastic. Accordingly, a pressing of the soft material can result a passing of the force onto protrusions 313 and in turn a passing of the force onto the buttons of portable electronic device 280. Thus, protrusions 313 enable a user to operate the buttons of portable electronic device 280 without having to open water-resistant casing 100. In some embodiments, protrusions 313 may include a detachable cap 330, which will be described below. One of ordinary skill in the art would appreciate that the protrusion 313 can have any shape and be located anywhere on back cover 300.

Referring to FIG. 3, back cover 300 may further include security mechanism opening 316. Security mechanism opening 316 may correspond to security mechanism 216 shown in FIG. 2. In some exemplary embodiments, security mechanism opening 316 enables the enclosed portable electronic device 280 to be attached to a security mechanism, such as a Kensington® portable computer lock. In particular, security mechanism opening 316 may permit a locking connector/cable/key to pass through it and be attached to portable electronic device 280. Thus, portable electronic device 280 may be secured from unauthorized removal. In some exemplary embodiments, security mechanism opening 316 can be located at the external side of the water sealing structure of water-resistant casing 100, such as the sealing structure. Accordingly, security mechanism opening 316 does not reduce or compromise the water resistance of water-resistant casing 100. One of ordinary skill in the art would appreciate that security mechanism opening 316 may also be located anywhere on back cover 300.

Referring to FIG. 3, back cover 300 further comprises a number of shaped portions, such as 318, 325, 327, 328, 330, and 332, which correspond to at least one of a lever, button, switch, and operating mechanism of portable electronic device 280. The shaped portions may enable an operation of portable electronic device 280 without opening water-resistant casing 100. One of ordinary skill in the art would appreciate that some or all of the shaped portions may also be attached to or incorporated in front cover 200 as shown in FIG. 2. Each of the shaped portions will be discussed in detail below.

Referring to FIG. 3, as an example, back cover 300 includes square portion 318 with a circular-shaped opening to enable the operation of a camera attached to portable electronic device 280. The circular-shaped opening may be covered by water-resistant film 320, which can be a transparent or substantially transparent film. The square portion 318 may be positioned at any part of back cover 300 or other part of water-resistant casing 100, corresponding to the camera's position on portable electronic device 280.

FIG. 3 also illustrates, for example, that back cover 300 includes circular portion 325 with an opening to enable the operation of a microphone attached to portable electronic device 280. The opening may be covered by water-resistant film 324, which may be a film that enables the microphone to collect sound from external of water-resistant casing 100. Circular portion 325 may be positioned at any part of back cover 300 or other part of water-resistant casing 100, corresponding to the microphone's position on portable electronic device 280.

Referring to FIG. 3, for example, back cover 300 also includes half-cylindrical portion 327 (the other half-cylindrical portion 219 is at a corresponding position of front cover 200, as shown in FIG. 2) to fit cap 218 as shown in FIG. 2. As discussed corresponding to FIG. 2, cap 218 can be used for enabling a wired communication between portable electronic device 280 and an external object. For example, cap 218 can enable external communication with an ear phone connector of portable electronic device 280.

The shaped portions, such as 318, 325, 327, 328, 330, and 332, may be covered with a film. For example, water-resistant film 320 covers square portion 318, and water-resistant film 324 covers circular portion 325. The films covering the shaped portions may be made of thermoforming plastics, polyvinylchoride materials, polycarbonate, Poly Methyl Methacrylate Acrylic (PMMA), Polytetrafluoroethylene (PTFE) porous material, polyester, adhesive tape, etc. The films covering the shaped portion may protect the shaped portions from water damage or intrusion, but do not substantially reduce or impact the functionality of the covered lever, button, switch, and operating mechanism of portable electronic device 280.

FIG. 3 also illustrates that back cover 300 includes resealable cap 328 and detachable cap 330 to enable the operation of a first and a second button attached to portable electronic device 280, respectively. For example, the first button may be a power button and the second button may be a volume button. Thus, resealable cap 328 and detachable 330 enable the operation of the power button and the volume button respectively without opening water-resistant casing 100. Two caps 328 and 330 may also be located at any part of back cover 300 or other part of water-resistant casing 100, corresponding to the buttons' positions on portable electronic device 280.

Moreover, one of ordinary skill in the art can also appreciate that water-resistant casing 100 can have any number of resealable caps corresponding to the underneath operating mechanisms of portable electronic device 280. In addition, back cover 300 may include convex molding areas, instead of resealable caps, to enable operation of the push buttons, keys, switches, sliding controls, knobs or other control mechanisms. For example, the convex molding areas can be included for operating the on/off button, the sleep/wake button, the silent/screen-rotation lock, and the volume up/down controls of an Apple iPad® series device.

Referring to FIG. 3, as an example, back cover 300 also includes trapezoid portion 332 with at least one narrow opening to enable the operation of a speaker attached to portable electronic device 280. The openings may be covered by water-resistant film 336, which may be a film that enables the speaker to provide sound to the external of water-resistant casing 100. Trapezoid portion 332 may be located at any part of back cover 300 or other part of water-resistant casing 100, corresponding to the speaker's position on portable electronic device 280.

One of ordinary skill in the art would appreciate that the shaped portions described above, i.e., 318, 325, 327, 328, 330, and 332, are for illustration purpose. Water-resistant casing 100 may comprise any number of shaped portions corresponding to the levers, buttons, switches, and any other operating mechanisms of portable electronic device 280.

Referring to FIG. 3, back cover 300 may further include mounting point 340 on back cover 300 to enable mounting of a carrying mechanism, such as detachable handle 500 (shown in FIG. 1), a tripod, a rope, a belt, a clamp, a quick-release latch, and a magnetic mounting piece. Mounting point 340 can be, for example, a screw hole, as shown in FIG. 3, to enable attaching of a hand-screw of detachable handle 500. Mounting point 340 can also be a screw hole having threads compatible with a standard camera tripod using ¼-20 UNC threads. Mounting point 340 can also be a magnetic securing mechanism, which enables detachable handle 500 to be magnetically attached to back cover 300. For example, mounting point 340 can include at least one of a permanent magnet and a ferromagnetic material. The magnets may be composed of NdFeB, NIB, or Neo. Detachable handle 500 will be discussed in detail corresponding to FIG. 5A.

Referring to FIG. 3, in some exemplary embodiments, mounting point 340 is located in the center of back cover 300. Mounting point 340 can also be located anywhere on back cover 300 or front cover 200 as desired. There may be one or more mounting points that are similar to or different from mounting point 340 and are placed on back cover 300, so that the carrying or supporting of water-resistant casing 100 can be at different locations for operability, weight balance, appearance, etc. In some embodiments, mounting point 340 may be an attaching or anchoring point for attaching a rope, a belt, or other soft carrying mechanisms. One or more mounting points may be positioned, for example, at the half distance along the longitudinal direction of back cover 300 such that water-resistant casing 100 may stay closely to the carrier when water-resistant casing 100 is carried on a rope, a belt, or another soft carrying mechanism. As another example, one or more mounting points 340 can also be positioned such that water-resistant casing 100 can be supported by the body of the user to allow single-handed operation of portable electronic device 280 (shown in FIG. 1).

Referring to FIG. 3, back cover 300 can include at least one impact-absorbing structure 342 coupled to back cover 300 for providing additional impact absorption. Impact-absorbing structure 342 can be the same or similar to impact-absorbing structure 206 described corresponding to FIG. 2. Impact-absorbing structure 342 may include one or more types of impact/shock-absorbing or impact/shock-reducing materials that can eliminate or reduce forces passed onto portable electronic device 280 in an event of a physical impact. Impact-absorbing structure 342 can be coupled to the external of back cover 300 and be detachable from it. Therefore, when portable electronic device 280 is used in an environment that has less risk of impact, impact-absorbing structure 342 can be removed and thus the weight of water-resistant casing 100 can be reduced.

Figure 6:
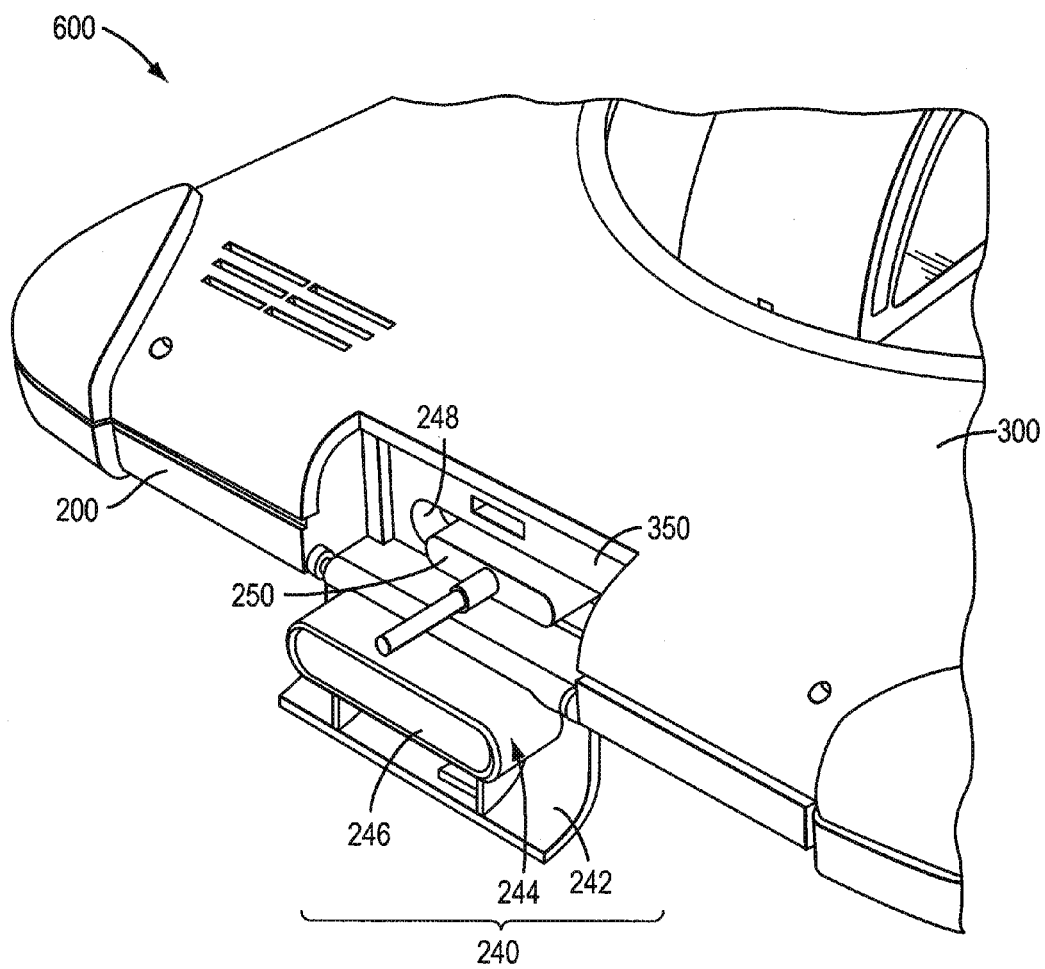
FIG. 6 illustrates an exemplary, perspective view of a resealable cap associated with the water-resistant casing consistent with an embodiment of the present disclosure.

Referring to FIG. 3, back cover 300 includes opening 350, which may enable portable electronic device 280 (shown in FIG. 1) to communicate with an external object. For example, opening 350 may allow an Apple iPad® series device to be charged or connected to a computer for data communication. Opening 350 is covered with resealable cap 240 discussed above corresponding to FIG. 2. Thus, opening 350 can be water-sealed. Resealable cap 240 and opening 350 are also shown in FIG. 6.

Back cover 300 may also include attachment mechanism 360, such as one or more recesses, slots, or holes, which hingedly, rotatably, movablely, or latchably couples front cover 200 to back cover 300, as shown in FIG. 1. Attachment mechanism 360 may have more than one instances and can be located, for example, at the bottom of back cover 300. Attachment mechanism 360 will be discussed in detail corresponding to FIG. 7.

Referring to FIG. 3, back cover 300 further comprises an anti-theft mechanism (not shown in FIG. 3) coupled to at least one of front cover 200 and back cover 300; air chamber 660 that is incorporated into at least one of front cover 200 and back cover 300. Air chamber 660 is configured to control water or air intake to adjust the floatability of water-resistant casing 100. Back cover 300 further comprises a sealing structure, which is coupled to the perimeter or edges of back cover 300 to provide a water-resistant seal.

In addition to security mechanisms 216 as shown in FIGS. 2 and 316 as shown in FIG. 3, back cover 300 and front cover 200 can also include an anti-theft mechanism, which may provide a second degree of protection against unauthorized opening of the casing. The anti-theft mechanism may include, for example, a fish-hook type structure. In some embodiments, the anti-theft mechanism may have a body that has a fish-hook or curved end. The fish-hook bodies may be coupled to or integrated in the inside of front cover 200 and back cover 300. When water-resistant casing 100 is enclosed, the curved ends of the anti-theft bodies on front cover 200 and back cover 300 connect and form a mutually re-enforceable structure such that an attempt to separate front cover 200 and back cover 300 by brutal force would result in a reverse force to tighten front cover 200 and back cover 300 even more. It is understood by those skilled in the art that similar or substantially similar anti-theft structures may also be implemented. Air chamber 660 and the sealing structure will be described in detail corresponding to FIGS. 8A and 8B, respectively.

Figure 4:
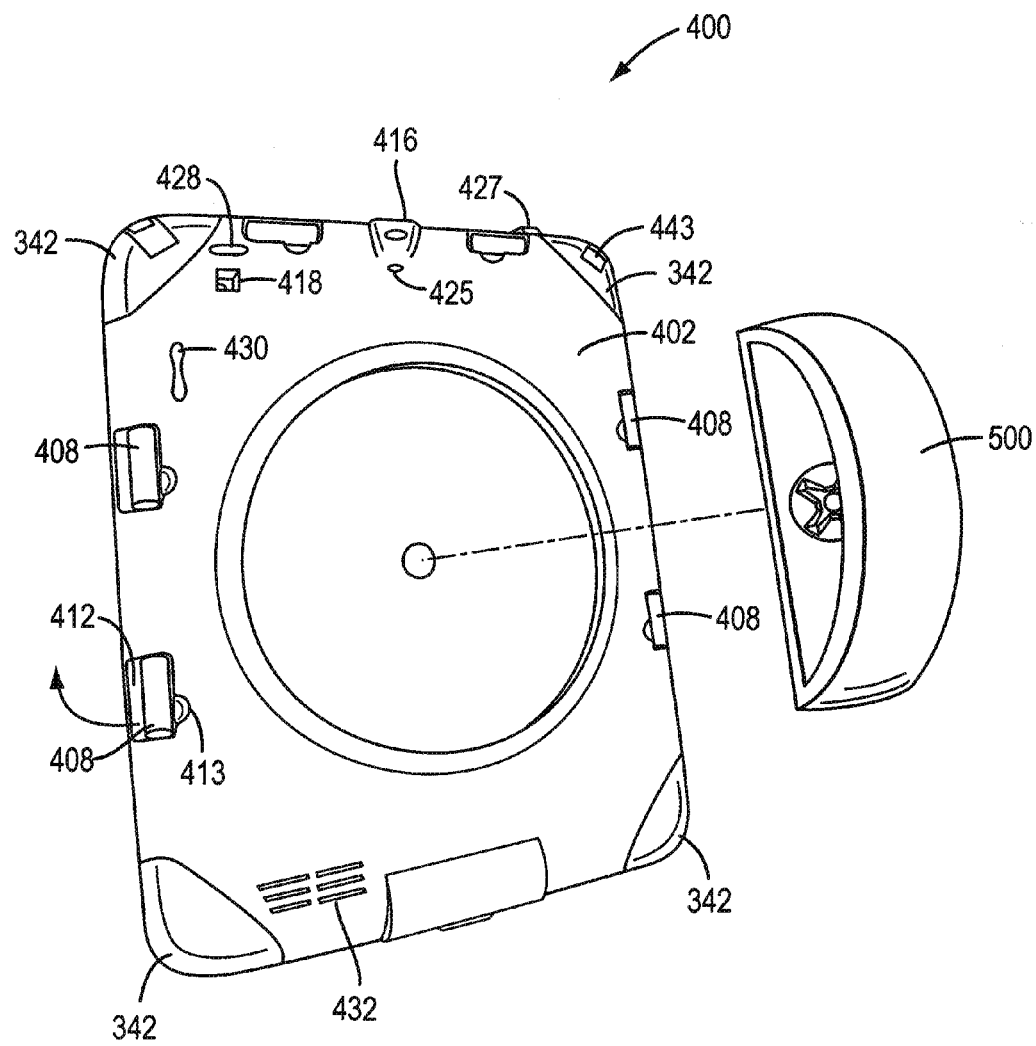
FIG. 4 illustrates an exemplary, exploded view of the outside of the back cover of the water-resistant casing as shown in FIG. 1.

FIG. 4 illustrates an exemplary, exploded view of the outer surface of back cover 300 (shown as 400). In some embodiments, back cover 300 comprises outer surface 402, and one or more outer rotating bodies 408 that are coupled to latching mechanism 308 as shown in FIG. 3. Back cover 300 may also comprise one or more concave areas 412 that is incorporated in back cover 300 for operating outer rotating body 408, and a plurality of shaped portions, such as 418, 425, 427, 428, 430, and 432, corresponding to at least one of a lever, button, switch, and operating mechanism of portable electronic device 280 for enabling an operation of portable electronic device 280 without opening water-resistant casing 100. Back cover 300 further comprises at least one impact-absorbing structure 342.

Referring to FIG. 4, outer surface 402 may include a material that is the same or similar to the inside of back cover 300, i.e., a material that is water-resistant and/or impact-absorbing. For example, the material can be hard-rubber, soft-rubber, plastic, polymer, etc. Examples of the materials include silicone rubber, acrylonitrile butadiene styrene (ABS), polycarbonate, and thermoplastic polyurethane (TPU). Outer surface 402 can be rugged, patterned, ribbed, or foamed for impact absorption or resistance. The materials of outer surface 402 can also be different from the inside of back cover 300. For example, outer surface 402 can include a coating layer that is resistant to wear and tear. In addition, the materials of outer surface 402 can be any materials described correspond to FIG. 1.

The outside of back cover 300 also comprises at least one outer rotating body 408, which is coupled to latching mechanism 308 as shown in FIG. 3. Outer rotating body 408 can be made of rubber, such as hard-rubber, plastic, metal or other suitable materials. Outer rotating body 408 can be hingedly, rotatably, movably, permanently, detachably, or latchably coupled to latching mechanism 308. For example, outer rotating body 408 can be pivotally coupled at one end of latching mechanism 308. In some exemplary embodiments, outer rotating body 408 can be rotated away from water-resistant casing 100 for opening or releasing latching mechanism 308, as shown in FIG. 4. One of ordinary skill in the art can appreciate that outer rotating body 408 can also be rotated in any other direction for opening or closing latching mechanism 308. It is also appreciated by those having ordinary skill in the art that latching mechanism 308 may be operated by pulling, pushing, rotating, touching, etc, that would allow the opening or closing of the casing.

Referring to FIG. 4, in some exemplary embodiments, concaved area 412 that is incorporated in the outside of back cover 300 is associated with latching mechanism 308 (shown in FIG. 3), for housing and operating outer rotating body 408. Thus, outer rotating body 408 may be kept below or at outer surface 402. In some exemplary embodiments, concaved area 412 can also include semi-sphere shaped indentation 413 that is located adjacent to outer rotating body 408, for providing easy operating of outer rotating body 408.

Referring to FIG. 4, in some exemplary embodiments, the outer surface of back cover 300 may also comprise security mechanism opening 416, corresponding to security mechanism opening 316 as shown in FIG. 3. In addition, a number of shaped portions or caps, such as 418, 425, 427 428, 430, and 432, correspond to the outsides of their counterparts, i.e., 318, 325, 327, 328, 330, and 332, respectively. The description of security mechanism opening 416 and shaped portions or caps 418, 425, 427 428, 430, and 432 are the same as or similar to those described corresponding to FIG. 3, and thus will be not be repeated. In some embodiments, the shaped portions or caps may be detachable or removable, so that the user can select for a favorable color or a favorable material. For example, cap 430 may include different materials that have different degrees of softness or flexibility. Cap 430 may be detachable or depressible, so that a user may operate the underneath button such as a volume control button. A softer or more flexible cap 430 can decrease the sensitivity of the volume control button and therefore can prevent an undesired operation. On the other hand, a less soft or less flexible cap 430 may increase the sensitivity of the volume control button and may be desirable so that a user may adjust the volume easily and frequently. In addition, cap 430 may also have different colors that a user can choose from.

Referring to FIG. 4, in some exemplary embodiments, the outer surface of back cover 300 also comprises at least one impact-absorbing structure 342. Impact-absorbing structure 342 corresponds to that shown in FIG. 3. Moreover, in some exemplary embodiments, Impact-absorbing structure 342 can include opening 207, which enables water resistant casing 100 (shown in FIG. 1) to be attached to an external object via a carrying mechanism, such as a rope, a belt, a string, a hook, etc.

Referring to FIG. 4, in some exemplary embodiments, detachable handle 500 may be mounted to outer surface 402. Detachable handle 500 can be mounted in the center of outer surface 402 or any other desired location. In some exemplary embodiments, when detachable handle 500 is separated from outer surface 402 and water-resistant casing 100 (shown in FIG. 1) is placed underwater, water-resistant casing 100 with the enclosed portable electronic device 280 (shown in FIG. 1) may be subject to an upward buoyant force as a result of the material and/or structure of water-resistant casing 100. Thus, if a user accidently drops water-resistant casing 100 into the water, water-resistant casing 100 would be floating and may be easily retrieved. The floating may be obtained by, for example, forming a layer of hollow structure inside back cover 300, or by including foam materials, such as styrofoam, inside back cover 300.

In some other applications, however, it may be desirable to prevent water-resistant casing 100 with the enclosed portable electronic device 280 from floating to the water surface, when water-resistant casing 100 is placed underwater. For example, in one application, a diver may need to operate portable electronic device 280 at a certain depth underneath a sea level. In these applications, detachable handle 500 can be attached to water-resistant casing 100 and be used as a weight to keep water-resistant casing 100 immersed underwater. It is appreciated by those having ordinary skill in the art that detachable handle 500 can have different weights for different floating requirements. The details of detachable handle 500 will be discussed corresponding to FIG. 5A.

Figure 5A:
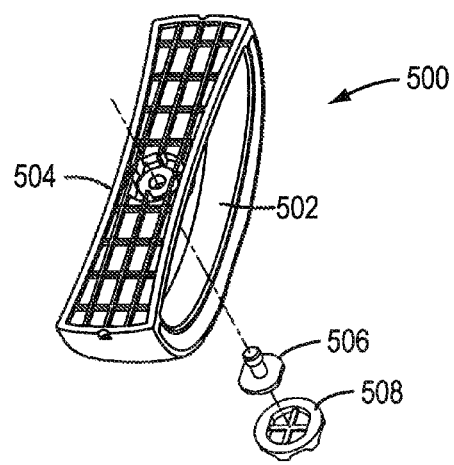
FIG. 5A illustrates an exemplary, exploded view of the detachable handle as shown in FIG. 1.

FIG. 5A illustrates an exemplary, exploded view of detachable handle 500 as shown in FIG. 4. Detachable handle 500 comprises handling body 502, mounting body 504 that is coupled to handling body 502, and mounting mechanisms 506 and 508 for mounting detachable handle 500 to water-resistant casing 100 (shown in FIG. 1). In some exemplary embodiments, handling body 502 can be of a semi-circle shape as shown in FIG. 5A, a trapezoidal shaped (not shown), or any other shape that is desired. Mounting body 504 can be coupled to or incorporated with handling body 502 at, for example, the two ends of handling body 502. Mounting body 504 may have, for example, an outward obround-shape for attaching of detachable handle 500.

Figure 5B:
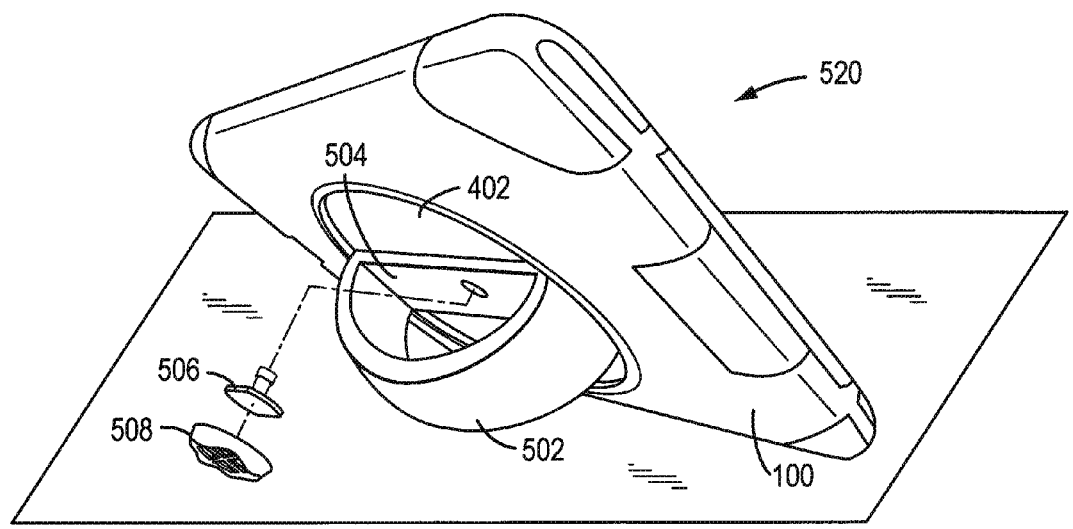
FIG. 5B illustrates an exemplary view of an exemplary detachable handle that is attached to the water-resistant casing as shown in FIG. 1.

FIG. 5B illustrates an exemplary view of an exemplary detachable handle 500 attached to water-resistant casing 100 as shown in FIG. 1. Mounting mechanism 506 enables the mounting of detachable handle 500 to water-resistant casing 100. In some exemplary embodiments, mounting mechanism 506 may be a hand-operateable screw. For example, by fastening hand-operateable screw 506 using screw cap 508, mounting body 504 can be attached to outer surface 402 through mounting point 340 as shown in FIG. 3. The attachment enables manipulation of water-resistant casing 100 through detachable handle 500. Mounting point 340 of back cover 300, as described corresponding to FIG. 3, can be a screw hole having thread that is compatible with a standard camera tripod using ¼-20 UNC threads. Thus, a tripod or any other handling or supporting structures that has a tripod-compatible screw can be connected or coupled to water-resistant casing 100.

In some exemplary embodiments, the mounting of detachable handle 500 may use a magnetic mounting mechanism. For example, outer surface 402, at mounting point 340 of back cover 300, may include at least one of a permanent magnet and a ferromagnetic material. The magnets may be composed of NdFeB, NIB, or Neo. Mounting body 504 may also include magnets or otherwise made to have magnetic properties so it can be magnetically coupled to outer surface 402 in a substantially secure manner, such as without detachment by gravity, by vibration, or by the force of a user's operation of portable electronic device 280 (shown in FIG. 1) enclosed in water-resistant casing 100. The strength of the magnetic field of outer surface 402 or mounting body 504, however, may be controlled so that it does not affect or substantially affect the operation of portable electronic device 280. In addition, magnetic shielding materials may be included in outer surface 402 to prevent the magnetic field from interfering with the electronic device. For example, a layer of sheet metal, metal screen, or metal foam may be included in outer surface 402. A layer of metallic ink or similar material may also be coated inside outer surface 402 to provide the shielding. Further, one of ordinary skill in the art would appreciate that detachable handle 500 may be mounted to water-resistant casing 100 by any type of mounting mechanism that is desired.

FIG. 5B also illustrates an exemplary view of detachable handle 500 that is attached to water-resistant casing 100, for supporting water-resistant casing 100 to be in a standing position. In some exemplary embodiments, the size, shape and attachment orientation of detachable handle 500 may be selected such that it may serve as a stand when portable electronic device 280 (shown in FIG. 1) is used in a portrait (vertical) orientation. In some exemplary embodiments, detachable handle 500 can support water-resistant casing 100 in a landscape (horizontal) orientation. For example, referring to FIG. 5B, with detachable handle 500 attached, water-resistant casing 100 enclosing an Apple iPad® device may be placed horizontally on a surface. This may be desired during, for example, a presentation or a photo slideshow.

FIG. 6 illustrates an exemplary, perspective view of resealable cap 240 as shown in FIG. 2. Resealable cap 240 includes cover 242, protrusion 244 and water-resistant seal 246. Cover 242 and protrusion 244 may or may not be made of water-resistant and impact-absorbing material that is the same as or similar to that of front cover 200. For example, cover 242 and protrusion 244 may be made of hard rubber or plastic material. Alternatively, cover 242 and protrusion 244 may be made of acrylonitrile butadiene styrene (ABS), metal, alloy, or any other suitable materials. Cover 242 can have a curved shape that matches opening 350 of back cover 300. Therefore, cover 242, when closed, snugly covers opening 350 to prevent the water from entering water-resistant casing 100 (shown in FIG. 1). Protrusion 244 may have an obround shape that matches the shape of port opening 248. Port opening 248 enables portable electronic device 280 to communicate with an external object through, for example, cable 250. When cable 250 is disconnected and cover 240 is closed, protrusion 244 fits snugly into port opening 248 and thus forms a water-resistant structure.

The water-resistant structure formed by resealable cap 240 may also be enhanced by water-resistant seal 246. Water-resistant seal 246 may be made of soft-rubber (e.g., silicone rubber) or plastic. As an example, water-resistant seal 246 may have the same or slightly different shape and size as protrusion 244. Thus, water-resistant seal 246 can be snugly coupled to protrusion 244 for providing sealing of port opening 248 when cover 240 is closed. For enhancing the coupling between protrusion 244 and water-resistant seal 246, additional features, such as flanges and grooves, can be included in protrusion 244 and water-resistant seal 246. One of ordinary skill in the art would appreciate that any other water-resistant structures may also be used for water-sealing of opening 350.

Figure 7A:
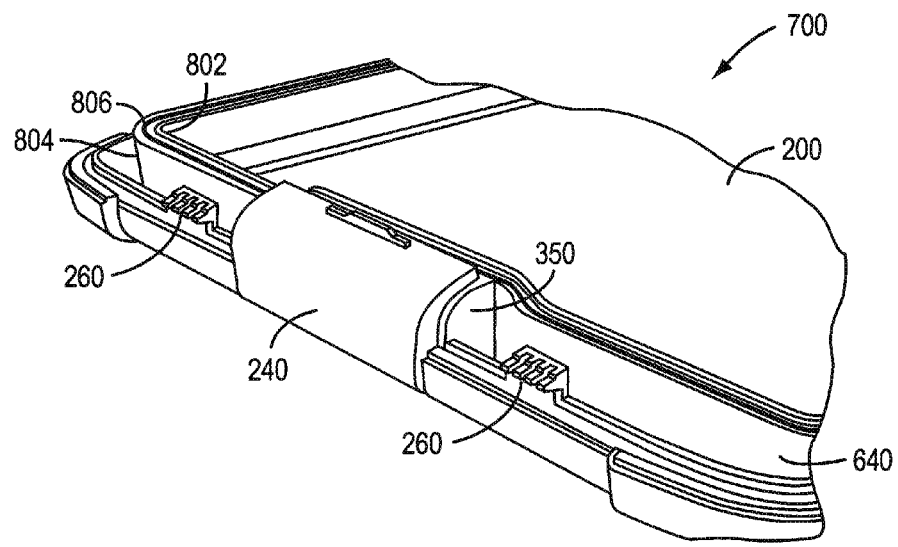
FIG. 7A illustrates an exemplary, perspective view of the attachment mechanism of the front cover as shown in FIG. 1.
Figure 7B:
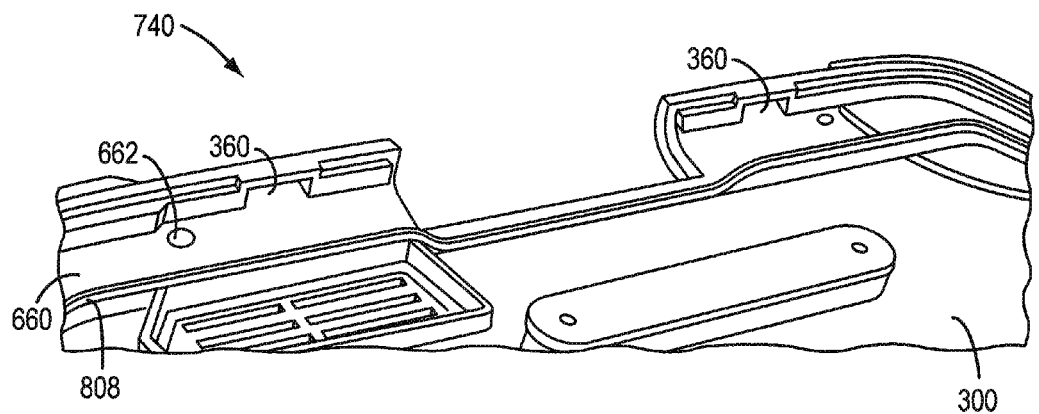
FIG. 7B illustrates an exemplary, perspective view of the attachment mechanism of the back cover as shown in FIG. 1.

FIG. 7A illustrates an exemplary, perspective view of coupling mechanism 260 of front cover 200 as shown in FIG. 1. FIG. 7B illustrates an exemplary, perspective view of the corresponding coupling mechanism 360 of back cover 300 as shown in FIG. 1. Coupling mechanism 260 may be, for example, one or more protrusions or tabs. The corresponding coupling mechanism 360 may be, for example, one or more recesses, slots, or holes. Coupling mechanisms 260 and 360 may hingedly, rotatably, movably, permanently, detachably, or latchably couple front cover 200 to back cover 300. As an example, FIG. 7A shows two instances of protrusion 260 having a rectangular shape and FIG. 7B shows two instances of recess 360 for housing protrusion 260. In this example, when front cover 200 and back cover 300 are coupled to each other, protrusions 260 are housed inside recesses 360, forming a connection that secures front cover 200 and back cover 300 together. One of ordinary skill in the art would appreciate that coupling mechanisms 260 and 360 may have other shapes and may include any number of instances. Coupling mechanisms 260 and 360 may also be located at any other edge of the front cover 200 and back cover 300.

FIG. 7A also illustrates an exemplary, perspective view of air chamber 640 in front cover 200. Air chamber 640 is configured to control water or air intake to adjust the floatability of water-resistant casing 100 as shown in FIG. 1. FIG. 7B illustrates an exemplary, perspective view of corresponding air chamber 660 in back cover 300. Referring to FIG. 7A, in some exemplary embodiments, air chamber 640 is formed at both sides of resealable cap 240 of front cover 200. As an example, front cover 200 may include a water-sealing structure that has inner water-barrier 802, outer water-barrier 804 and seal strip 806 that is disposed between inner water-barrier 802 and outer water-barrier 804. Correspondingly, back cover 300 may include water-sealing rim 808. The water-sealing structure will be also discussed corresponding to FIGS. 8A-8B.

The water-sealing structures of front cover 200 and back cover 300 can prevent water from entering the inside of water-resistant casing 100 (shown in FIG. 1) to cause damage of portable electronic device 280. Air chamber 640 is disposed between outer water-barrier 804 and the edges of front cover 200. Air chamber 660 is disposed between water-sealing rim 808 and the edges of back cover 300. Air chamber 660 is for controlling water-intake when water-resistant casing 100 is immersed underwater or air-intake when water-resistant casing 100 is removed from the water surface. For example, when water-resistant casing 100 is immersed underwater, air chambers 660 will be filled with water through venting opening 662 at back cover 300. Therefore, air will not be trapped inside water-resistant casing 100. But because of the double water-barrier water-sealing structure, water will not be able to enter the chamber where portable electronic device 280 is located. Conversely, when water-resistant casing 100 is lifted from the water surface, the water in air chambers 660 will be drained quickly through venting opening 662, so that water will not be trapped inside water-resistant casing 100. Thus, potential damage to portable electronic device 280 can be avoided when water-resistant casing 100 is opened.

Figure 8A:
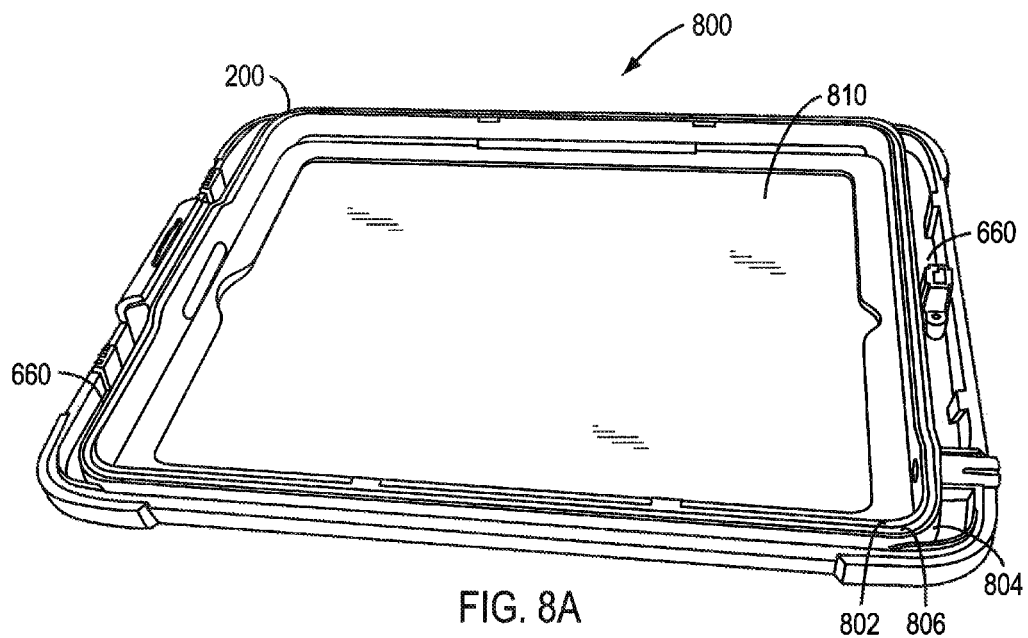
FIG. 8A illustrates an exemplary, perspective view of the water sealing structure of the front cover as shown in FIG. 2.

FIG. 8A illustrates an exemplary, perspective view of the water-sealing structure of front cover 200. Referring to FIG. 8A, in some embodiments, the water-sealing structure includes inner water-barrier 802, outer water-barrier 804 and seal strip 806 that is disposed between inner water-barrier 802 and outer water-barrier 804. The water-sealing structure separates front cover 200 into device chamber 810 and one or more air chambers 660. Referring to FIG. 8A, in some embodiments, air chambers 660 are located near both the top and bottom edges of front cover 200. Air chambers 660 may use venting openings, such as venting opening 662 (shown in FIG. 7B), that are located at back cover 300 for water intake or air-intake. Air chambers 660 may also use security mechanism opening 316 of back cover 300 (shown in FIG. 3) for water intake or air-intake. One of ordinary skill in the art would appreciate that any number of air chambers 660 and any number of venting openings can be located at any position of water-resistant casing 100.

Figure 8B:
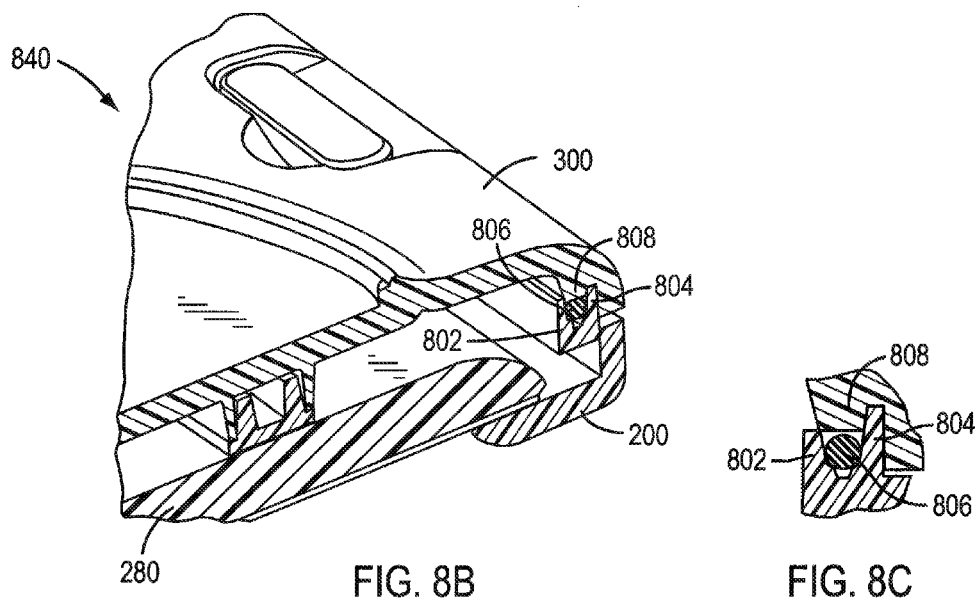
FIG. 8B illustrates an exemplary, cross-sectional view of the water-sealing structure of the front cover and the water-sealing rim of the back cover, when the water-resistance casing is closed.
Figure 8C:
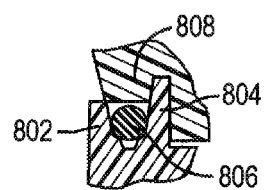
FIG. 8C illustrates an exemplary, cross-sectional view of the water-sealing structure as shown in FIG. 8B.

FIG. 8B illustrates an exemplary, cross-sectional view of the water-sealing structure of front cover 200 and water-sealing rim 808 of back cover 300. FIG. 8C illustrates an exemplary, enlarged cross-sectional view of the water-sealing structure as shown in FIG. 8B. Referring to FIGS. 8B and 8C, when front cover 200 and back cover 300 enclose portable electronic device 280, water-sealing rim 808 fits snugly into the space formed between inner water-barrier 802 and outer water-barrier 804 and is in close contact with seal strip 806, forming a water-sealing coupling that protects portable electronic device 280 from water intrusion or damage.

In some exemplary embodiments, the water-sealing coupling, formed by the water-sealing structure of front cover 200 and water-sealing rim 808 of back cover 300, can protect portable electronic device 280 from an increased water pressure when the depth of water immersion increases. The water-sealing coupling may surround the perimeter or edges of portable electronic device 280. In some exemplary embodiments, water-resistant casing 100 may conform to the IPX7, IPX8, or higher waterproof standards (International IRC 60529). Water-resistant casing 100 conforming to the IPX7 standard protects the enclosed portable electronic device 280 against water immersion for at least 30 minutes at a depth of at least 1 meter. Water-resistant casing 100 conforming to a higher IPX8 standard protects against water submersion and water-resistant casing 100 is suitable for continual submersion in water under conditions which are identified by the manufacturer. As an example, in some embodiments, water-resistant casing 100 may withstand an immersion of 1 meter under water for 1 hour.

In some other embodiments, a water-resistant casing for an electronic tablet is also provided. The water-resistant casing includes a front cover and a back cover. The front cover includes a water-resistant shield that enables a user's operation of the electronic tablet through the water-resistant shield, and a water-resistant seal that is coupled with a perimeter or edges of the water-resistant shield to provide water resistance and impact absorption. The front cover may also include two or more water-barriers and one or more seal strips that are disposed between the water-barriers. The back cover is coupled to the front cover and includes a material that is water-resistant, impact-absorbing, or both. The back cover also includes one or more rims that are coupled to a perimeter or edges of the back cover. The one or more rims are capable of contacting with the one or more seal strips to provide water-resistance.

The water-resistant casing further includes one or more air chambers that are incorporated into the front cover, the back cover, or both. The air chambers are for controlling of air release or water intake when the water-resistant casing is underwater and the controlling of air intake or water release when the water-resistant casing is taken out of water. The water-resistant casing includes a plurality of rotatable latches that are mounted on one or more outer edges of the front cover, the back cover, or both, for enclosing the water-resistant casing along at least a portion of the outer perimeter of the water-resistant casing. The water-resistant casing also includes one or more impact-absorbing structures that are detachably coupled externally to the front cover, the back cover, or both. The impact-absorbing structures are for providing additional impact absorption.

The water-resistant casing for an electronic tablet may further include one or more impact-absorbing structures that are attached to, or incorporated into, one or more inside of the back cover. The one or more impact-absorbing structures comprise rubber and are configured to provide a gap between a back surface of the electronic tablet and the back cover.

In some other embodiments, a protective casing for an electronic tablet is also provided. The protective casing includes a front cover, and a back cover that is coupled to the front cover. The front cover includes a flexible impact-resistant shield that enables a user's operation of the electronic tablet through the flexible impact-resistant shield. The flexible impact-resistant shield is also water-resistant. The front cover also includes an impact-absorbing seal that is coupled with the perimeter of the flexible impact-resistant shield to provide water resistance and impact absorption. The back cover includes a heat-dissipating material that is water-resistant, impact-absorbing, or both. The protective casing also includes a sealing structure that is coupled to the perimeter or edges of the front cover, the back cover, or both, to provide a water-resistant seal.

The protective casing for the electronic tablet further includes one or more cushions that are snugly attached to protrusions that are coupled to an inside of incorporated into the back cover. The one or more cushions include plastic or rubber and are used for adjusting a gap between a back surface of the electronic tablet and the back cover. The protective casing includes a plurality of rotatable latches that are mounted on one or more outer edges of the front cover, the back cover, or both, for enclosing the protective casing along at least a portion of the outer perimeter of the protective casing. The protective casing includes one or more mounting point that is coupled to or integrated in the back cover to enable a mounting of a detachable handle for the protective casing, or an attachment of a soft carrying mechanism to enable a single-handed operation of the electronic tablet, or both. The protective casing also includes one or more detachable anti-collision bumpers that are coupled to the external corners or edges of the front cover, the back cover, or both, for providing additional impact absorption.

The sealing structure that is coupled to the perimeter of at least one of the front cover and the back cover of the protective casing includes an inner water-barrier, an outer water-barrier, and a seal strip that is disposed between the inner water-barrier and the outer water-barrier. The sealing structure that is coupled to the other cover includes a rim that is capable of contacting with the seal strip to provide the water-resistant seal.

In the preceding specification, the claimed subject matter has been described with reference to specific exemplary embodiments. It will, however, be evident that various modifications and changes may be made without departing from the broader spirit and scope of the claimed subject matter as set forth in the claims that follow. The specification and drawings are accordingly to be regarded as illustrative rather than restrictive. Other embodiments of the claimed subject matter may be apparent to those skilled in the art from consideration of the specification and practice of the claimed subject matter disclosed herein.

What is claimed is:

1. A water-resistant casing for a portable electronic device, comprising:
    a front cover comprising:
        a water-resistant film enabling a user operation of the portable electronic device through the water-resistant film, and
        an impact-absorbing seal coupled with a perimeter of the water-resistant film to provide water resistance and impact absorption;
    a back cover coupled to the front cover, the back cover comprising a material that is at least water-resistant or impact-absorbing;
    a sealing structure coupled to a perimeter of at least one of the front cover and the back cover to provide a water-resistant seal;
    a latching mechanism mounted on at least one outer edge of at least one of the front cover and the back cover, for enclosing the water-resistant casing along at least a portion of the outer perimeter of the water-resistant casing;
    at least one mounting point coupled to or integrated in the back cover;
    at least one impact-absorbing structure detachably coupled to at least one of the front cover and the back cover externally for providing additional impact absorption; and
    an air chamber that is incorporated into at least one of the front cover and the back cover, the air chamber is configured to control water or air intake to adjust the floatability of the water-resistant casing.

2. The water-resistant casing of claim 1, wherein the impact-absorbing seal of the front cover comprises at least one of water-sealing adhesive, rubber and an elastic material.

3. The water-resistant casing of claim 1, wherein the back cover is hingedly, rotatably, movably, permanently, detachably, or latchably coupled with the front cover and is at least one of rugged, patterned, foamed and strength-enhanced by including a plurality of ribs for impact absorption.

4. The water-resistant casing of claim 1, wherein the back cover further comprises a metallic material that enables heat-dissipation.

5. The water-resistant casing of claim 1, wherein the sealing structure coupled to one of the front cover and the back cover comprises an inner water-barrier, an outer water-barrier, and a seal strip disposed between the inner water-barrier and the outer water-barrier; and the sealing structure coupled to the other cover comprises a rim being capable of contacting with the seal strip to provide the water-resistant seal.

6. The water-resistant casing of claim 1, further comprising at least one impact-absorbing structure attached to at least one inside of or incorporated into the back cover, wherein the at least one impact-absorbing structure comprises rubber and is configured to provide a gap between a back surface of the portable device and the back cover.

7. The water-resistant casing of claim 1, wherein the latching mechanism comprises at least two latches distributed along each of a first, second and third outer edges of the back cover for sealing of the water-resistant casing.

8. The water-resistant casing of claim 1, wherein at least one of the front cover and the back cover further comprises at least one shaped portion corresponding to at least one of a lever, button, switch, and operating mechanism of the portable electronic device for enabling an operation of the portable electronic device without opening the water-resistant casing.

9. The water-resistant casing of claim 1, further comprising a detachable handle coupled to the mounting point, the detachable handle serves as at least one of a stand for the water-resistant casing and a floatation/diving adjustment for the water-resistant casing.

10. The water-resistant casing of claim 1, further comprising at least one resealable cap coupled with at least one of the front cover and the back cover for enabling at least one of a charging of and wired communication with the portable electronic device.

11. The water-resistant casing of claim 1, further comprising a security mechanism associated with the front cover and the back cover that is capable of being coupled with an external lock for securing the portable electronic device.

12. The water-resistant casing of claim 1, further comprising at least one opening in the front cover or the back cover, wherein the at least one opening is covered with a water-resistant film for enabling at least one of a camera, speaker, microphone, and headset functions of the portable electronic device.

13. The water-resistant casing of claim 1, wherein the mounting point is at least one of an opening having a screw thread compatible with a standard camera tripod using ¼-20 UNC threads and a magnetic mounting piece comprising at least one of a permanent magnet and a ferromagnetic material.

14. A water-resistant casing for an electronic tablet, comprising:
a front cover comprising
a water-resistant shield enabling a user operation of the electronic tablet through the water-resistant shield,
an water-resistant seal coupled with a perimeter of the water-resistant shield to provide water resistance and impact absorption, and
at least two water-barriers and at least one seal strip disposed between the at least two water-barriers;
a back cover coupled to the front cover, the back cover comprising
a material that is at least water-resistant or impact-absorbing;
at least one rim coupled to a perimeter of the back cover, the at least one rim being capable of contacting with the at least one seal strip to provide water-resistance;
at least one air chamber that is incorporated into at least one of the front cover and the back cover for controlling air release or water intake when the water-resistant casing is underwater and for controlling air intake or water release when the water-resistant casing is taken out of water;
a plurality of rotatable latches mounted on at least one outer edge of at least one of the front cover and the back cover, for enclosing the water-resistant casing along at least a portion of the outer perimeter of the water-resistant casing; and at least one impact-absorbing structure detachably coupled to at least one of the front cover and the back cover externally for providing additional impact absorption.

15. The water-resistant casing of claim 14, further comprising at least one impact-absorbing structure attached to at least one inside of or incorporated into the back cover, wherein the at least one impact-absorbing structure comprises rubber and is configured to provide a gap between a back surface of the electronic tablet and the back cover.

16. The water-resistant casing of claim 14, wherein the plurality of rotatable latches comprises at least two latches distributed along each of a first, second and third outer edges of the back cover for sealing of the water-resistant casing.

17. The water-resistant casing of claim 14, wherein at least one of the front cover and the back cover further comprises at least one shaped portion corresponding to at least one of a lever, button, switch, and operating mechanism of the electronic tablet for enabling an operation of the electronic tablet without opening the water-resistant casing.

18. The water-resistant casing of claim 14, further comprising a mounting point coupled to or integrated in the back cover to enable mounting of a detachable handle, wherein the mounting point is at least one of an opening having a screw thread compatible with a standard camera tripod using ¼-20 UNC threads and a magnetic mounting piece comprising at least one of a permanent magnet and a ferromagnetic material.

19. The water-resistant casing of claim 18, wherein the detachable handle serves as at least one of a stand for the water-resistant casing and a floatation/diving adjustment for the water-resistant casing.

20. A protective casing for an electronic tablet, comprising:
a front cover comprising
a flexible impact-resistant shield enabling a user operation of the electronic tablet through the flexible impact-resistant shield, the flexible impact-resistant shield being water-resistant, and
an impact-absorbing seal coupled with the perimeter of the flexible impact-resistant shield to provide water resistance and impact absorption;
a back cover coupled to the front cover, the back cover comprising a heat-dissipating material that is at least water-resistant or impact-absorbing;
a sealing structure coupled to a perimeter of at least one of the front cover and the back cover to provide a water-resistant seal;
at least one cushion snugly attached to protrusions coupled to an inside of or incorporated into the back cover, wherein the at least one cushion comprises plastic or rubber and is used for adjusting a gap between a back surface of the electronic tablet and the back cover;
a plurality of rotatable latches mounted on at least one outer edge of at least one of the front cover and the back cover, for enclosing the protective casing along at least a portion of the outer perimeter of the protective casing;
at least one mounting point coupled to or integrated in the back cover to enable at least one of a mounting of a detachable handle for the protective casing and an attachment of a soft carrying mechanism to enable a single-handed operation of the electronic tablet; and
at least one detachable anti-collision bumper coupled to the external corners or edges of at least one of the front cover and the back cover for providing additional impact absorption.

21. The protective casing of claim 20, wherein the sealing structure coupled the perimeter of at least one of the front cover and the back cover comprises an inner water-barrier, an outer water-barrier, and a seal strip disposed between the inner water-barrier and the outer water-barrier; and the sealing structure coupled to the other cover comprises a rim being capable of contacting with the seal strip to provide the water-resistant seal.

22. The protective casing of claim 20, further comprising an air chamber that is incorporated into at least one of the front cover and the back cover, the air chamber is configured to control water or air intake to adjust the floatability of the protective casing.

23. The protective casing of claim 20, wherein at least one of the front cover and the back cover further comprises at least one removable shaped portion corresponding to at least one of a lever, button, switch, and operating mechanism of the electronic tablet for enabling an operation of the electronic tablet without opening the electronic tablet.

24. The protective casing of claim 20, wherein the mounting point is at least one of an opening having a screw thread compatible with a standard camera tripod using ¼-20 UNC threads and a magnetic mounting piece comprising at least one of a permanent magnet and a ferromagnetic material.

25. The protective casing of claim 20, further comprising at least one opening in at least one of the front cover and the back cover, wherein the at least one opening is covered with a water-resistant film for enabling at least one of a camera, speaker, microphone, and headset functions of the electronic tablet.

* * * * *